US009882833B2

(12) United States Patent
McBride et al.

(10) Patent No.: US 9,882,833 B2
(45) Date of Patent: Jan. 30, 2018

(54) INTENT-BASED SERVICES ORCHESTRATION

(71) Applicant: CenturyLink Intellectual Property LLC, Denver, CO (US)

(72) Inventors: Kevin M. McBride, Lone Tree, CO (US); Aaron Jones, Aurora, CO (US); John McManus, Englewood, CO (US); William O'Brien, Jr., Aurora, CO (US); Carl Matthew Olson, Bainbridge Island, WA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 84 days.

(21) Appl. No.: 14/983,884

(22) Filed: Dec. 30, 2015

(65) Prior Publication Data

US 2017/0093750 A1    Mar. 30, 2017

Related U.S. Application Data

(60) Provisional application No. 62/247,294, filed on Oct. 28, 2015, provisional application No. 62/233,911, filed on Sep. 28, 2015.

(51) Int. Cl.
*G06F 15/173* (2006.01)
*H04L 12/927* (2013.01)
*H04L 12/923* (2013.01)

(52) U.S. Cl.
CPC .......... *H04L 47/805* (2013.01); *H04L 47/762* (2013.01)

(58) Field of Classification Search
None
See application file for complete search history.

(56) References Cited

U.S. PATENT DOCUMENTS 6,182,275 B1    1/2001   Beelitz et al.
6,427,150 B1    7/2002   Oashi
(Continued)

FOREIGN PATENT DOCUMENTS

KR    10-2012-0060014 A    6/2012
KR    10-2013-0093717 A    8/2013
(Continued)

OTHER PUBLICATIONS

U.S. Appl. No. 14/531,000; Non-Final Rejection dated Aug. 26, 2016; 26 pages.
(Continued)

*Primary Examiner* — Mohamed Ibrahim
(74) *Attorney, Agent, or Firm* — Swanson & Bratschun, L.L.C.

(57) ABSTRACT

Novel tools and techniques might provide for implementing intent-based network services orchestration. In some embodiments, a computing system might receive, over a network, a request for network services from a customer. The request for network services might include desired performance parameters for the requested network services, without information regarding any of specific hardware, specific hardware type, specific location, or specific network for providing the requested network services. The computing system might allocate network resources from one or more networks, based at least in part on the desired performance parameters. Based on a determination that at least one network can no longer provide at least one network resource having the desired performance parameters, the computing system might allocate at least one other network resource from at least one second network, based at least in part on network performance metrics, and based at least in part on the desired performance parameters.

31 Claims, 10 Drawing Sheets

(56) References Cited

U.S. PATENT DOCUMENTS

| | | | |
|---|---|---|---|
| 6,560,641 B1 | 5/2003 | Powderly et al. | |
| 6,577,327 B1 | 6/2003 | Rochford et al. | |
| 7,664,115 B1 | 2/2010 | Robotham | |
| 7,672,923 B1* | 3/2010 | Reed | H04L 41/147 706/50 |
| 7,693,079 B2 | 4/2010 | Cerami et al. | |
| 7,953,865 B1 | 5/2011 | Miller et al. | |
| 8,051,382 B1 | 11/2011 | Kingdom et al. | |
| 8,103,480 B2* | 1/2012 | Korn | G06Q 10/06 702/182 |
| 8,223,655 B2 | 7/2012 | Heinz | |
| 8,462,632 B1 | 6/2013 | Vincent | |
| 8,717,895 B2 | 5/2014 | Koponen et al. | |
| 8,750,288 B2 | 6/2014 | Nakil et al. | |
| 8,755,377 B2 | 6/2014 | Nakil et al. | |
| 8,953,441 B2 | 2/2015 | Nakil et al. | |
| 8,959,185 B2 | 2/2015 | Nakil et al. | |
| 9,098,214 B1 | 8/2015 | Vincent et al. | |
| 9,141,416 B2 | 9/2015 | Bugenhagen | |
| 9,158,565 B2 | 10/2015 | Jakoljevic et al. | |
| 9,185,170 B1 | 11/2015 | Grammel | |
| 9,250,863 B1 | 2/2016 | Vincent et al. | |
| 9,356,883 B1* | 5/2016 | Borthakur | H04L 41/5025 |
| 9,386,001 B1 | 7/2016 | Marquardt et al. | |
| 9,417,902 B1 | 8/2016 | Noonan | |
| 9,495,188 B1 | 11/2016 | Ettema et al. | |
| 9,703,598 B2 | 7/2017 | Vincent et al. | |
| 2002/0152305 A1* | 10/2002 | Jackson | H04L 43/00 709/224 |
| 2003/0055919 A1 | 3/2003 | Fong | |
| 2004/0015966 A1 | 1/2004 | Macchiano et al. | |
| 2005/0144288 A1 | 6/2005 | Liao | |
| 2006/0235973 A1 | 10/2006 | McBride et al. | |
| 2007/0094085 A1 | 4/2007 | Redmond et al. | |
| 2007/0165818 A1 | 7/2007 | Savoor et al. | |
| 2007/0230358 A1 | 10/2007 | Narayanan et al. | |
| 2008/0002676 A1 | 1/2008 | Wiley | |
| 2008/0049639 A1* | 2/2008 | Wiley | H04L 41/18 370/252 |
| 2008/0049640 A1 | 2/2008 | Heinz et al. | |
| 2008/0049927 A1 | 2/2008 | Wiley | |
| 2008/0052387 A1* | 2/2008 | Heinz | H04L 41/5025 709/223 |
| 2008/0155537 A1 | 6/2008 | Dinda et al. | |
| 2008/0259794 A1 | 10/2008 | Zou et al. | |
| 2009/0092151 A1 | 4/2009 | Raguet et al. | |
| 2009/0187654 A1 | 7/2009 | Raja et al. | |
| 2009/0292858 A1 | 11/2009 | Lambeth et al. | |
| 2010/0023623 A1 | 1/2010 | Saffre et al. | |
| 2010/0043068 A1 | 2/2010 | Varadhan et al. | |
| 2010/0100640 A1 | 4/2010 | Nakao | |
| 2010/0122334 A1 | 5/2010 | Stanzione et al. | |
| 2010/0162238 A1 | 6/2010 | Warfield | |
| 2010/0192152 A1 | 7/2010 | Miyamoto et al. | |
| 2010/0217837 A1 | 8/2010 | Ansari | |
| 2010/0235580 A1 | 9/2010 | Bouvier | |
| 2011/0134930 A1 | 6/2011 | McLaren | |
| 2011/0209157 A1 | 8/2011 | Sumida et al. | |
| 2011/0222412 A1 | 9/2011 | Kompella | |
| 2011/0231551 A1 | 9/2011 | Hassan et al. | |
| 2011/0252418 A1 | 10/2011 | Havivi et al. | |
| 2011/0276951 A1 | 11/2011 | Jain | |
| 2011/0296234 A1 | 12/2011 | Oshins et al. | |
| 2011/0310899 A1 | 12/2011 | Alkhatib et al. | |
| 2011/0314469 A1 | 12/2011 | Qian et al. | |
| 2012/0042040 A1 | 2/2012 | Bailey et al. | |
| 2012/0072909 A1 | 3/2012 | Malik et al. | |
| 2012/0089845 A1 | 4/2012 | Raleigh | |
| 2012/0151087 A1 | 6/2012 | Azam | |
| 2012/0151277 A1 | 6/2012 | Jung et al. | |
| 2012/0167083 A1 | 6/2012 | Suit | |
| 2012/0174099 A1 | 7/2012 | Ashok et al. | |
| 2012/0304175 A1 | 11/2012 | Damola et al. | |
| 2012/0331461 A1 | 12/2012 | Fries et al. | |
| 2013/0003538 A1 | 1/2013 | Greenberg et al. | |
| 2013/0031543 A1 | 1/2013 | Angus | |
| 2013/0058215 A1 | 3/2013 | Koponen et al. | |
| 2013/0061297 A1 | 3/2013 | Larsen et al. | |
| 2013/0147906 A1 | 6/2013 | Weiser et al. | |
| 2013/0191850 A1 | 7/2013 | Fischer et al. | |
| 2013/0204971 A1 | 8/2013 | Brandwine et al. | |
| 2013/0212600 A1 | 8/2013 | Harsh et al. | |
| 2013/0227670 A1 | 8/2013 | Ahmad et al. | |
| 2013/0262652 A1 | 10/2013 | Vuyk et al. | |
| 2013/0275968 A1 | 10/2013 | Petev et al. | |
| 2013/0332926 A1 | 12/2013 | Jakoljevic et al. | |
| 2014/0016924 A1 | 1/2014 | Gonzalez De Dios | |
| 2014/0123140 A1 | 5/2014 | Motoki | |
| 2014/0164618 A1 | 6/2014 | Alicherry et al. | |
| 2014/0189050 A1 | 7/2014 | Rijsman et al. | |
| 2014/0201374 A1 | 7/2014 | Ashwood-Smith et al. | |
| 2014/0280499 A1 | 9/2014 | Basavaiah et al. | |
| 2014/0282528 A1 | 9/2014 | Bugenhagen | |
| 2014/0282529 A1 | 9/2014 | Bugenhagen | |
| 2014/0307744 A1 | 10/2014 | Dunbar et al. | |
| 2014/0313984 A1 | 10/2014 | Diamond | |
| 2014/0321260 A1 | 10/2014 | Mishra et al. | |
| 2014/0347979 A1 | 11/2014 | Tanaka | |
| 2014/0359556 A1 | 12/2014 | Jujare et al. | |
| 2014/0372788 A1 | 12/2014 | Vavrick et al. | |
| 2015/0049601 A1 | 2/2015 | Bugenhagen | |
| 2015/0074793 A1 | 3/2015 | Dalvi et al. | |
| 2015/0088825 A1 | 3/2015 | Bloom et al. | |
| 2015/0089331 A1 | 3/2015 | Skerry et al. | |
| 2015/0117454 A1 | 4/2015 | Koponen et al. | |
| 2015/0143368 A1 | 5/2015 | Bugenhagen | |
| 2015/0150020 A1* | 5/2015 | Duttagupta | G06F 9/466 718/104 |
| 2015/0207699 A1 | 7/2015 | Fargano et al. | |
| 2015/0244617 A1 | 8/2015 | Nakil et al. | |
| 2015/0288541 A1 | 10/2015 | Fargano et al. | |
| 2015/0288622 A1 | 10/2015 | Fargano et al. | |
| 2015/0288767 A1 | 10/2015 | Fargano et al. | |
| 2015/0324220 A1 | 11/2015 | Bugenhagen | |
| 2015/0339156 A1 | 11/2015 | Vincent et al. | |
| 2016/0006696 A1 | 1/2016 | Donley et al. | |
| 2016/0048403 A1 | 2/2016 | Bugenhagen | |
| 2016/0050159 A1 | 2/2016 | Cook et al. | |
| 2016/0197779 A1 | 7/2016 | Soejima | |
| 2016/0301668 A1 | 10/2016 | Marquardt et al. | |
| 2016/0337206 A1 | 11/2016 | Bugenhagen et al. | |
| 2016/0337270 A1 | 11/2016 | Heinonen et al. | |
| 2017/0093750 A1 | 3/2017 | McBride et al. | |
| 2017/0097834 A1 | 4/2017 | Cropper et al. | |
| 2017/0123839 A1 | 5/2017 | Bugenhagen | |

FOREIGN PATENT DOCUMENTS

| | | |
|---|---|---|
| KR | 10-1472013 B1 | 12/2014 |
| KR | 20-140075925 | 12/2014 |
| KR | 20-140145645 A | 12/2014 |
| WO | WO 2014/110453 A1 | 7/2014 |
| WO | WO 2014-150715 A1 | 9/2014 |
| WO | WO-2014-150715 A1 | 9/2014 |
| WO | WO 2015/077460 | 5/2015 |
| WO | WO 2015-126430 A1 | 8/2015 |
| WO | WO 2016/025497 | 2/2016 |
| WO | WO 2016/025501 | 2/2016 |
| WO | WO-2017/058350 A1 | 4/2017 |
| WO | WO-2017-146768 A1 | 8/2017 |

OTHER PUBLICATIONS

U.S. Appl. No. 14/460,085; Final Rejection dated Aug. 31, 2016; 31 pages.

U.S. Appl. No. 14/583,952; Final Rejection dated Oct. 3, 2016; 34 pages.

International Search Report and Written Opinion prepared by the Korean Intellectual Property Office as International Searching Authority for PCT International Patent Application No. PCT/US16/44882, dated Nov. 7, 2016, 11 pages.

(56) References Cited

OTHER PUBLICATIONS

International Search Report and Written Opinion prepared by the Korean Intellectual Property Office as International Searching Authority for PCT Intl Patent App. No. PCT/US2016/044867; 13 pages.
U.S. Appl. No. 14/531,000; Final Rejection dated Dec. 15, 2016; 24 pages.
U.S. Appl. No. 14/730,695; Non-Final Rejection dated Dec. 2, 2016; 27 pages.
U.S. Appl. No. 14/583,952; Notice of Panel Decision from Pre-Appeal Brief Review dated Feb. 23, 2017; 2 pages.
International Application No. PCT/US2015/044690; International Preliminary Report on Patentability dated Feb. 23, 2017; 9 pages.
International Application No. PCT/US2015/044682; International Preliminary Report on Patentability dated Mar. 2, 2017; 10 pages.
U.S. Appl. No. 14/678,280; Non-Final Rejection dated Mar. 21, 2017, 94 pages.
Batalle' (2013), "On the Implementation of NFV over an OpenFlow Infrastructure: Routing Function Virtualization"; 6 pages.
Metzler (2013) "The 2013 Guide to Network Virtualization and SDN"; https://www.avaya.com/en/documents/the_2013_guide_to-network_virtualization_and_sdn.pdf; 6 pages.
U.S. Appl. No. 14/730,695; Final Rejection dated Mar. 29, 2017, 27 pages.
U.S. Appl. No. 14/531,000; Non-Final Rejection dated Mar. 31, 2017; 32 pages.
U.S. Appl. No. 15/408,232; Non-Final Rejection dated Apr. 10, 2017; 24 pages.
ETSI Group Specification (Oct. 2013), "Network Functions Virtualisation (NFV); Use Cases"; 50 pages.
Wikipedia (Oct. 2014), "Network Functions Virtualization" http://en.wikipedia.org/wiki/Network_Functions_virtualization; accessed on Oct. 23, 2014; 5 pages.
U.S. Appl. No. 14/460,085; Non-Final Rejection dated May 10, 2017; 30 pages.
Bohoris, Christos; "Network Performance Management Using Mobile Software Agents"; Jun. 2003; Centre for Communications Systems Research School of Electronics and Physical Sciences; University of Surrey, UK; 188 pages.
U.S. Appl. No. 14/583,952; Non-Final Rejection dated May 31, 2017; 34 pages.
LightReading (Mar. 17, 2015). "RAD Launches vCPE Platform for Hosting VNFs." Web Site www.lightreading.com/nfv/nfv-elements/rad-launches-vcpe-platform-for-hosting-vnfs. Accessed Sep. 8, 2015, 1 page.
Gowan, Bo. (Jun. 22, 2015) "Ciena unveils a carrier-grade CPE for NFV." Web Site www.ciena.com/connect/blog/Ciena-unveils-a-carrier-grade-CPE-for-NFV.html. Accessed Sep. 8, 2015, 4 pages.
Henrik Basilier et al. Ericsson Review. Virtualizing network services-the telecom cloud, Mar. 28, 2014, Retrieved from the Internet: <http://www.ericsson.com/res/thecompany/docs/publications/ericssor_review/2014/er-telecom-cloud.pdf> ISSN 0014-0171. pp. 1-9.
International Application No. PCT/US2014/024050; International Preliminary Report on Patentability dated Sep. 24, 2015; 6 pages.
International Application No. PCT/US2014/024050; Published Application dated Sep. 25, 2014; 55 pages.
International Application No. PCT/US2014/066628; Notification Concerning Availability of the Publication of the International Application dated May 28, 2015; 1 page.
International Application No. PCT/US2015/044682; International Search Report and Written Opinion dated Nov. 16, 2015; 13 pages.
International Application No. PCT/US2015/044690; International Search Report and Written Opinion dated Dec. 4, 2015; 12 pages.
International Search Report and Written Opinion prepared by the Korean Intellectual Property Office as International Searching Authority for PCT Intl Patent App. No. PCT/US2014/024050 dated Jun. 27, 2014; 9 pages.
International Search Report and Written Opinion prepared by the Korean Intellectual Property Office as International Searching Authority for PCT Intl Patent App. No. PCT/US2014/066628 dated Mar. 10, 2015; 10 pages.
Publication Notice of PCT Intl Patent App. No. PCT/US2014/024050 dated Sep. 25, 2014; 1 page.
Stuart Clayman et al. 'The Dynamic Placement of Virtual Network Functions.' In: 2014 IEEE Network Operations and Management Symposium (NOMS), May 5-9, 2014, pp. 1-9.
U.S. Appl. No. 14/060,450; Final Rejection dated May 21, 2015; 20 pages.
U.S. Appl. No. 14/060,450; Non-Final Rejection dated Feb. 12, 2015; 33 pages.
U.S. Appl. No. 14/061,147; Issue Notification dated Sep. 2, 2015; 1 page.
U.S. Appl. No. 14/061,147; Non-Final Rejection dated Dec. 19, 2014; 29 pages.
U.S. Appl. No. 14/061,147; Notice of Allowance and Interview Summary dated Apr. 29, 2015; 29 pages.
U.S. Appl. No. 14/460,085; Non-Final Rejection dated Feb. 22, 2016; 28 pages.
U.S. Appl. No. 14/531,000; Non-Final Rejection dated Jan. 29, 2016; 30 pages.
U.S. Appl. No. 14/583,952; Non-Final Rejection dated Mar. 29, 2016; 32 pages.
U.S. Appl. No. 14/531,000; Final Rejection dated May 2, 2016; 23 pages.
International Application No. PCT/US2014/066628; International Preliminary Report on Patentability dated Jun. 2, 2016; 7 pages.
Kang et al, "Optimizing the "One Big Switch" Abstraction in Software-Defined Networks", ACM, CoNEXT13, Dec. 2013, pp. 13-24.
U.S. Appl. No. 14/531,000; Notice of Allowance dated Aug. 31, 2017; 47 pages.
U.S. Appl. No. 14/678,309; Non-Final Rejection dated Jun. 16, 2017; 26 pages.
U.S. Appl. No. 14/678,309; Notice of Allowance dated Jul. 13, 2017; 19 pages.
U.S. Appl. No. 14/730,695; Non-Final Rejection dated Aug. 11, 2017 26 pages.
U.S. Appl. No. 15/408,232; Final Rejection dated Aug. 10, 2017; 31 pages.
Vilalta et al., "Network Virtualization Controller for Abstraction and Control of Open-Flow-enabled Multi-tenant Multi-technology Transport Networks", IEEE, Jun. 2015, pp. 1-3.
Yu et al., "What SDN will Bring for Transport Networks?", Open Networking Summit 2014, Mar. 2014, pp. 1-2.
U.S. Appl. No. 14/678,208; Non-Final Rejection dated Sep. 29, 2017; 21 pages.
U.S. Appl. No. 14/583,952; Notice of Allowance dated Oct. 4, 2017; 41 pages.
U.S. Appl. No. 14/678,280; Non-Final Rejection dated Oct. 19, 2017, 135 pages.
U.S. Appl. No. 14/460,085; Final Rejection dated Nov. 15, 2017; 34 pages.
U.S. Appl. No. 14/678,208; Notice of Allowance dated Dec. 05, 2017; 18 pages.

\* cited by examiner

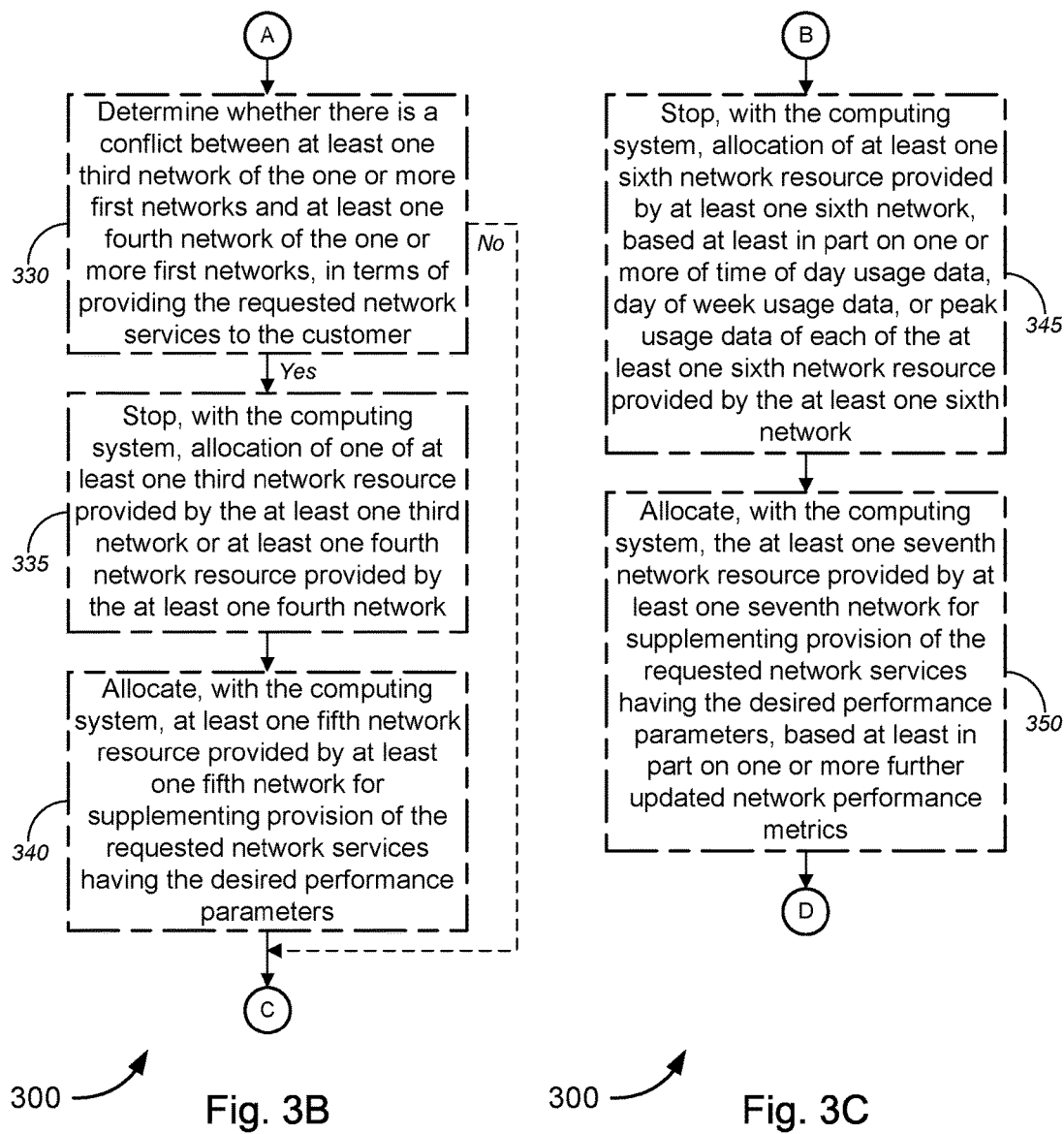

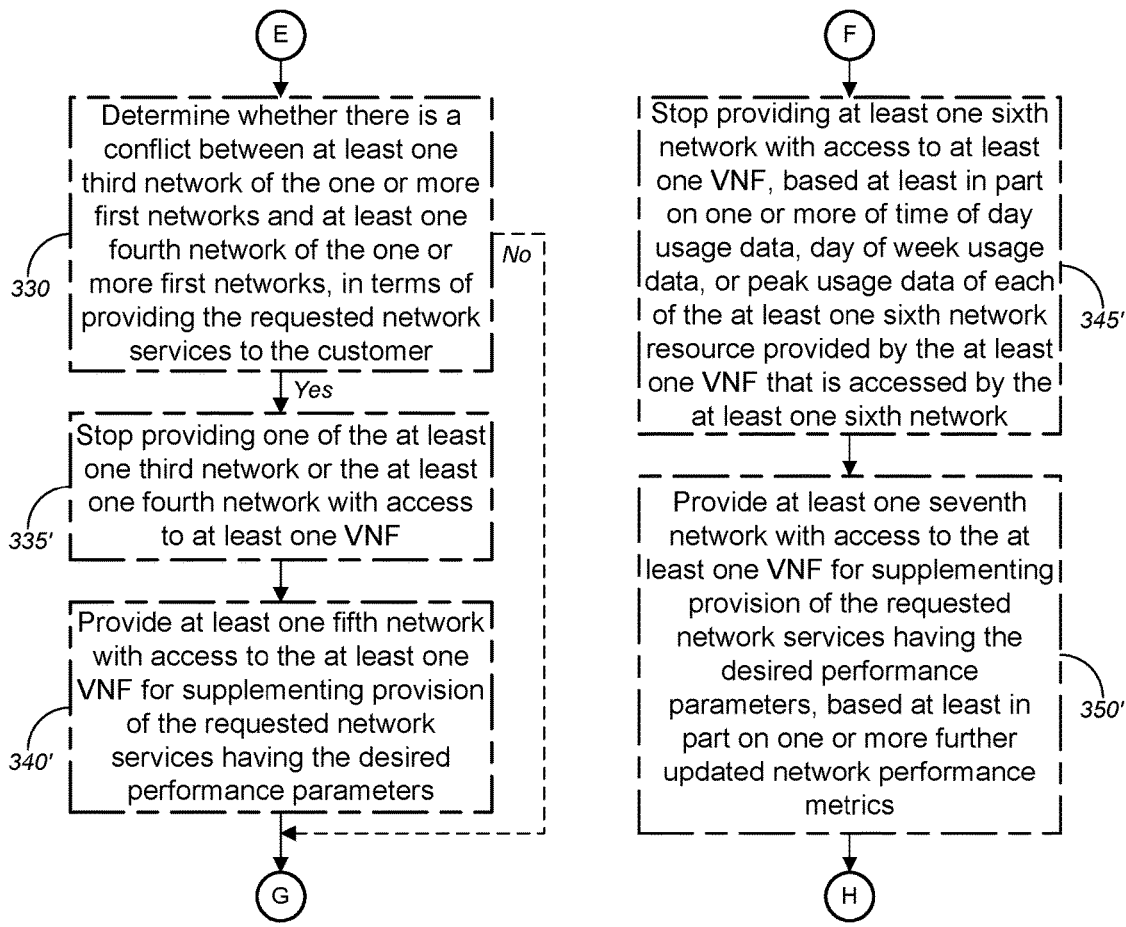

INTENT-BASED SERVICES ORCHESTRATION

CROSS-REFERENCES TO RELATED APPLICATIONS

This application claims priority to U.S. Patent Application Ser. No. 62/233,911 (the "'911 application"), filed Sep. 28, 2015 by Kevin M. McBride et al., entitled, "Intent-Based Services Orchestration" and U.S. Patent Application Ser. No. 62/247,294, filed Oct. 28, 2015 by Kevin M. McBride et al., entitled, "Intent-Based Services Orchestration."

This application may be related to U.S. patent application Ser. No. 14/730,695 (the "'695 application"), filed Jun. 4, 2015 by Charles I. Cook et al., entitled, "Remoting Application Servers," which claims benefit of priority to provisional U.S. Patent Application Ser. No. 62/037,096, filed Aug. 13, 2014 by Charles I. Cook et al., entitled, "Remoting Application Servers." This application may also be related to U.S. patent application Ser. No. 14/678,208 (the "'208 application"), filed on a date on Apr. 3, 2015 by Michael J. Fargano et al., entitled, "Network Functions Virtualization Interconnection Gateway," U.S. patent application Ser. No. 14/678,280 (the "'280 application"), filed on a date on Apr. 3, 2015 herewith by Michael J. Fargano et al., entitled, "Network Functions Virtualization Interconnection Hub," and U.S. patent application Ser. No. 14/678,309 (the "'309 application"), filed on a date on Apr. 3, 2015 by Michael J. Fargano et al., entitled, "Customer Environment Network Functions Virtualization (NFV)." Each of the '208, '280, and '309 applications claims priority to U.S. Patent Application Ser. No. 61/974,927 (the "'927 application"), filed Apr. 3, 2014 by Michael J. Fargano, entitled, "Network Functions Virtualization Interconnection Gateway," U.S. Patent Application Ser. No. 61/974,930 (the "'930 application"), filed Apr. 3, 2014 by Michael J. Fargano, entitled, "Network Functions Virtualization Interconnection Hub," U.S. Patent Application Ser. No. 61/976,896 (the "'896 application"), filed Apr. 8, 2014 by Michael J. Fargano, entitled, "Customer Environment Network Functions Virtualization (NFV)," and to U.S. Patent Application Ser. No. 61/977,820 (the "'820 application"), filed Apr. 10, 2014 by Michael J. Fargano, entitled, "Customer Environment Network Functions Virtualization (NFV)."

This application may also be related to U.S. patent application Ser. No. 14/583,952 (the "'952 application"), filed Dec. 29, 2014 by Michael K. Bugenhagen, entitled, "Multi-line/Multi-state Virtualized OAM Transponder," which claims priority to U.S. Patent Application Ser. No. 62/038,201 (the "'201 application"), filed Aug. 15, 2014 by Michael K. Bugenhagen, entitled, "Multi-line/Multi-state Virtualized OAM Transponder"; U.S. patent application Ser. No. 14/460,085 (the "'085 application"), filed Aug. 14, 2014 by Michael K. Bugenhagen, entitled, "Ethernet Carrier Group Alarm (CGA)," which claims benefit of priority to provisional U.S. Patent Application Ser. No. 61/865,865 (the "'865 application"), filed Aug. 14, 2013 by Michael K. Bugenhagen, entitled, "Ethernet Carrier Group Alarm (CGA)"; and U.S. patent application Ser. No. 14/531,000 (the "'000 application"), filed Nov. 3, 2014 by Michael K. Bugenhagen, entitled, "Physical to Virtual Network Transport Function Abstraction," which claims benefit of priority to provisional U.S. Patent Application Ser. No. 61/907,330 (the "'330 application"), filed Nov. 21, 2013 by Michael K. Bugenhagen, entitled, "Physical to Virtual Network Transport Function Abstraction."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing network services orchestration, and, in particular embodiments, to methods, systems, and computer software for implementing intent-based network services orchestration.

BACKGROUND

In typical network resource allocation schemes, a customer might provide a request for network services from a set list of network services, which might include, among other things, information regarding one or more of specific hardware, specific hardware type, specific location, and/or specific network for providing network services, or the like. The customer might select the particular hardware, hardware type, location, and/or network based on stated or estimated performance metrics for these components or generic versions of these components, but might not convey the customer's specific desired performance parameters. The service provider then allocates network resources based on the selected one or more of specific hardware, specific hardware type, specific location, or specific network for providing network services, as indicated in the request.

When there is a change in the network (e.g., over-utilization, network problems, etc.), however, such specific requests do not necessarily provide the service provider with the intent or expectations of the customer. Accordingly, the service provider will likely make network resource reallocation decisions based on what is best for the network from the perspective of the service provider, but not necessarily what is best for the customer.

Further certain networks do not provide for automated or automatic reallocation of network resources based on performance metrics of the network and/or components or elements of the network. Accordingly, such networks cannot automatically reallocate network resources based on both performance metrics of the network and/or components or elements of the network and based on intent-based requests from a customer.

Hence, there is a need for more robust and scalable solutions for implementing network services orchestration, and, in particular embodiments, for implementing intent-based network services orchestration.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3F are flow diagrams illustrating various methods for implementing intent-based network services orchestration, in accordance with various embodiments.

DETAILED DESCRIPTION OF CERTAIN EMBODIMENTS

Overview

Figure 1A:
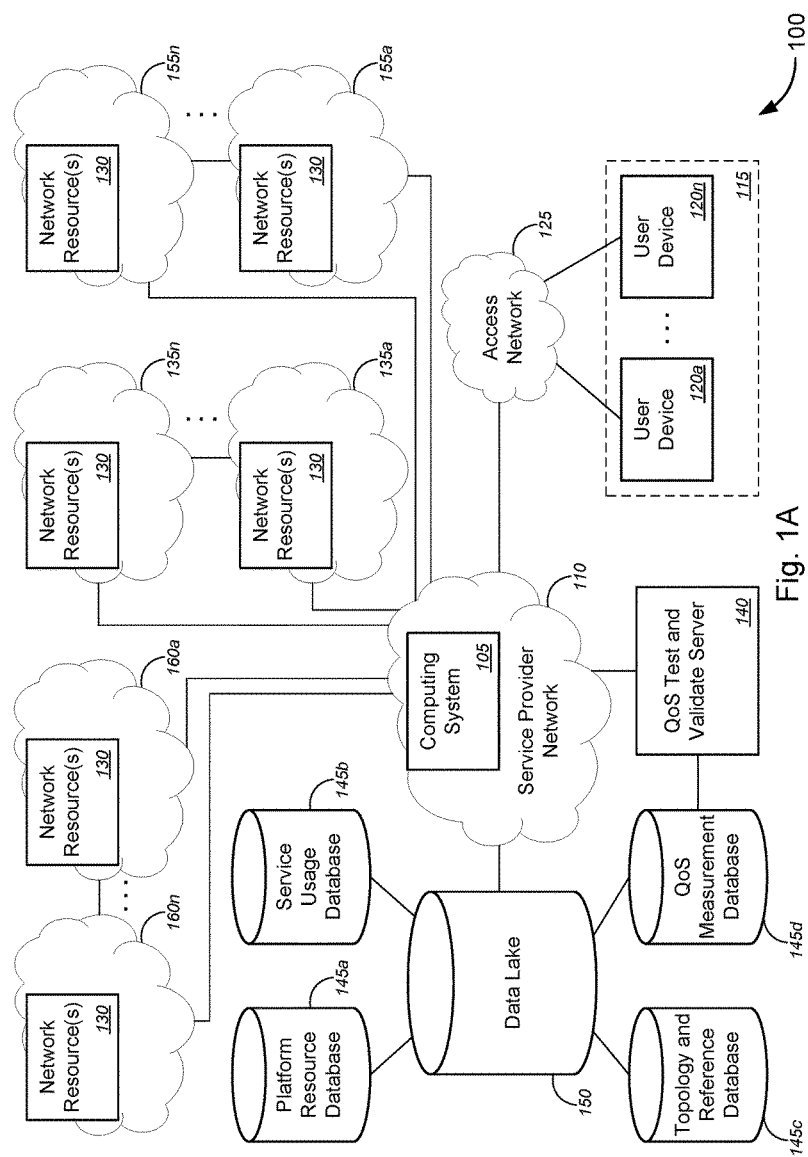
FIGS. 1A and 1B are schematic diagrams illustrating various systems for implementing intent-based network services orchestration, in accordance with various embodiments.

Various embodiments provide tools and techniques for implementing network services orchestration, and, in particular embodiments, for implementing intent-based network services orchestration.

In various embodiments, a computing system might receive (either via wired or wireless connection) a request for network services from a customer, via one or more user devices, over a network. The one or more user devices might include, without limitation, at least one of a smart phone, a mobile phone, a tablet computer, a laptop computer, a desktop computer, and/or the like. The request for network services might include desired performance parameters for the requested network services, without information regarding any of specific hardware, specific hardware type, specific location, or specific network for providing the requested network services. The desired performance parameters, in some embodiments, might include, but is not limited to, at least one of a maximum latency, a maximum jitter, or a maximum packet loss, and/or the like. Alternatively, or additionally, the desired performance parameters might include, without limitation, at least one of performance parameters defined in a service level agreement ("SLA") associated with the customer or performance parameters defined in terms of natural resource usage, and/or the like.

The computing system might allocate one or more network resources from one or more first networks of a first set of networks for providing the requested network services, based at least in part on the desired performance parameters and/or based at least in part on a determination that the one or more first networks is capable of providing network resources each having the desired performance parameters. The computing system might determine whether at least one first network of the one or more first networks can no longer provide at least one first network resource, of the one or more network resources, having the desired performance parameters, based at least in part on one or more network performance metrics. Based on a determination that at least one first network can no longer provide at least one first network resource having the desired performance parameters, the computing system might allocate at least one second network resource from one or more second networks of a second set of networks for supplementing provision of the requested network services having the desired performance parameters, in some cases, based at least in part on one or more updated network performance metrics, thereby replacing or augmenting the at least one first network resource provided from the one or more first networks of the first set of networks.

Network Functions Virtualization ("NFV") and virtual network functions ("VNFs") may be used to implement resource allocation for the intent-based services orchestration described herein. Implementation of NFV and VNFs, in general, and in specific other embodiments (i.e., non-intent-based services orchestration embodiments), is described in detail in the '695, '208, '280, and '309 applications, which have already been incorporated herein by reference in their entirety.

Leveraging feedback loops from a service provider's big data/data warehouse ecosystem to provide enhanced abilities to intent-based APIs and orchestration systems within NFV/SDN Orchestration environments and other service delivery technologies in future. Feedback loops may provide knowledge of best primary site and, for disaster recovery reasons, an alternative site(s) for virtualized infrastructure to be deployed based on performance and utilization statistics stored in the service providers big data/data warehouse ecosystem. A feedback loop sub-system, with ability to allow triggers or subscription to message bus channel to allow for notification of network performance condition changes, might trigger various orchestration systems to re-deploy virtualized software/instances/machines to alternative sites or dynamically reconfigure network.

In one non-limiting example, a feedback loop system might be implemented through SDN controller hierarchy to optimize a network(s) or to define specific network flows for countermeasure. In another non-limiting example, latency increases, due to convergence events (e.g., outages) or over-utilization/circuit exhaust, or the like, might trigger virtualized infrastructure redeployment into better sites for services delivery, or network optimization occurs to prevent re-deployment.

A feedback loop might maintain awareness of time of day, day of week, and/or other variables for enhancing placement of virtualized infrastructure into a service provider network. In one non-limiting example, a service provider's metro network may experience peak utilization during the hours of 5 p.m. and 9 p.m. on Mondays through Fridays, which could enrich the continuing intent placement of virtualized content delivery networks ("CDN"), providing caching services into all sites during peak utilization over 70% and to offload from backbone elements in a provider's network.

Further, having historical trends could also allow for placement of services to prevent network degradation by scale-out of existing virtual infrastructure systems or deploying additional virtualized infrastructure systems or optimization of the network to augment capacity (e.g., in a bandwidth-on-demand ("BoD")-type manner, or the like) or software-defined network ("SDN") controller calls.

A feedback loop sub-system can provide facility of tracking performance characteristics of various services and how they interact with one another on the same compute or network paths. In one non-limiting example, some VNFs may not reside well with other VNFs on the same kernel-based virtual machine ("KVM") compute or Linux container environment, based on historical indicators of necessary re-deployment due to congestion or bursty co-tenant behavior. In another non-limiting example, bursty or chatty broadcast or L2 communications or routing loops within a split-horizon network topology may trigger network optimization to occur by making calls into SDN controllers where adjustments to behavior of split-horizon to not carry specific flows from endpoints in the network to prohibit, drop, and/or throttle the traffic, based on policies or counter increments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, network resource allocation technology, and/or the like. In other aspects, certain embodiments, can improve the functioning of a computer or network system itself (e.g., computing devices or systems that form parts of the network, computing devices or systems, network elements or the like for performing the functionalities described below, etc.), for example, by enabling automatic reallocation of network resources or re-provisioning of access to VNFs to certain other networks, based at least in part on performance metrics of the various networks and based at least in part on intent-based requests of customers, or the like, thereby improving network and/or computing system functionalities, and/or the like. In particular, to the extent any abstract concepts are present in the various embodiments, those concepts can be implemented as described herein by devices, software, systems, and methods that involve specific novel functionality (e.g., steps or operations), such as enabling automatic reallocation of network resources or re-provisioning of access to VNFs to certain other networks, based at least in part on performance metrics of the various networks and based at least in part on intent-based requests of customers, enabling improved network functionality, enabling improved network resource allocation, enabling improved network resource utilization, and/or the like, to name a few examples, that extend beyond mere conventional computer processing operations. These functionalities can produce tangible results outside of the implementing computer system, including, merely by way of example, ability to improve network functions, network resource allocation and utilization, and/or the like, in various embodiments based on the intent-driven requests for network resource from customers, which may be observed or measured by customers and/or service providers.

In an aspect, a method might comprise receiving, with a computing system over a network, a request for network services from a customer. The request for network services might comprise desired performance parameters for the requested network services, without information regarding any of specific hardware, specific hardware type, specific location, or specific network for providing the requested network services, and/or the like. The method might also comprise allocating, with the computing system, one or more network resources from one or more first networks of a first set of networks for providing the requested network services, based at least in part on the desired performance parameters and based at least in part on a determination that the one or more first networks is capable of providing network resources each having the desired performance parameters. The method might further comprise determining, with the computing system, whether at least one first network of the one or more first networks can no longer provide at least one first network resource, of the one or more network resources, having the desired performance parameters, based at least in part on one or more network performance metrics. The method might comprise, based on a determination that at least one first network can no longer provide at least one first network resource having the desired performance parameters, allocating, with the computing system, at least one second network resource from at least one second network of a second set of networks for supplementing provision of the requested network services having the desired performance parameters, based at least in part on one or more updated network performance metrics, thereby replacing or augmenting the at least one first network resource provided from the one or more first networks of the first set of networks.

In some embodiments, the desired performance parameters might comprise at least one of a maximum latency, a maximum jitter, or a maximum packet loss, and/or the like. Alternatively, or additionally, the desired performance parameters might comprise at least one of performance parameters defined in a service level agreement ("SLA") associated with the customer or performance parameters defined in terms of natural resource usage, and/or the like.

According to some embodiments, each of the one or more network performance metrics and the one or more updated network performance metrics might comprise at least one of quality of service ("QoS") measurement data, platform resource data and metrics, service usage data, topology and reference data, historical network data, or network usage trend data, and/or the like. Alternatively, or additionally, each of the one or more network performance metrics and the one or more updated network performance metrics might comprise one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

In some instances, the determination that the one or more first networks is capable of providing network resources each having the desired performance parameters might be based on one or more network performance metrics of the one or more first networks at the time that the request for network services from a customer is received. In some cases, determining whether at least one first network of the one or more first networks can no longer provide at least one first network resource having the desired performance parameters might comprise determining, with the computing system, whether at least one first network of the one or more first networks can no longer provide at least one first network resource having the desired performance parameters, based at least in part on one or more network performance metrics of at least one of the one or more first networks, the at least one second network, the first set of networks, or the second set of networks. According to some embodiments, the second set of networks is different from the first set of networks by at least one network. In some cases, the at least one second network is different from each of the one or more first networks.

In some embodiments, the method might further comprise, based on a determination that there is a conflict between at least one third network of the one or more first networks and at least one fourth network of the one or more first networks, in terms of providing the requested network services to the customer, stopping, with the computing system, allocation of one of at least one third network resource provided by the at least one third network or at least one fourth network resource provided by the at least one fourth network, and allocating, with the computing system, at least one fifth network resource provided by at least one fifth network for supplementing provision of the requested network services having the desired performance parameters, based at least in part on one or more further updated network performance metrics. The at least one fifth network might be part of one of the first set of networks, the second set of networks, or a third set of networks that is separate from either the first set of networks or the second set of networks.

According to some embodiments, the method might further comprise, based at least in part on one or more of time of day usage data, day of week usage data, or peak usage data of each of at least one sixth network resource provided by at least one sixth network of the one or more first networks and at least one seventh network resource provided by at least one seventh network, stopping, with the computing system, allocation of the at least one sixth network resource provided by the at least one sixth network, and allocating, with the computing system, the at least one seventh network resource provided by at least one seventh network for supplementing provision of the requested network services having the desired performance parameters, based at least in part on one or more further updated network performance metrics. The at least one seventh network might be part of one of the first set of networks, the second set of networks, or a third set of networks that is separate from either the first set of networks or the second set of networks.

Merely by way of example, in some embodiments, allocating one or more network resources from one or more first networks of a first set of networks for providing the requested network services might comprise providing the one or more first networks with access to one or more virtual network functions ("VNFs") for use by the customer, the one or more VNFs providing the one or more network resources having the desired performance parameters. In some instances, providing access to the one or more VNFs might comprise bursting, using an application programming interface ("API"), one or more VNFs to one or more network functions virtualization ("NFV") entities at the one or more first networks. Likewise, in some embodiments, allocating at least one second network resource from at least one second network of a second set of networks for supplementing provision of the requested network services might comprise providing the at least one second network with access to one or more VNFs for use by the customer, the one or more VNFs providing the at least one second network resource having the desired performance parameters. In some cases, providing access to the one or more VNFs comprises bursting, using an API, one or more VNFs to one or more NFV entities at the at least one second network.

According to some embodiments, determining, with the computing system, whether at least one first network of the one or more first networks can no longer provide at least one first network resource, of the one or more network resources, having the desired performance parameters, based at least in part on one or more network performance metrics, might be performed in one of a real-time manner, a periodic manner, a per-request manner, or a random manner.

In another aspect, a computing system might comprise at least one processor and at least one non-transitory computer readable medium communicatively coupled to the at least one processor. The at least one non-transitory computer readable medium might have stored thereon computer software comprising a set of instructions that, when executed by the at least one processor, causes the computing system to receive, over a network, a request for network services from a customer, the request for network services comprising desired performance parameters for the requested network services, without information regarding any of specific hardware, specific hardware type, specific location, or specific network for providing the requested network services; allocate one or more network resources from one or more first networks of a first set of networks for providing the requested network services, based at least in part on the desired performance parameters and based at least in part on a determination that the one or more first networks is capable of providing network resources each having the desired performance parameters; determine whether at least one first network of the one or more first networks can no longer provide at least one first network resource, of the one or more network resources, having the desired performance parameters, based at least in part on one or more network performance metrics; and based on a determination that at least one first network can no longer provide at least one first network resource having the desired performance parameters, allocate at least one second network resource from at least one second network of a second set of networks for supplementing provision of the requested network services having the desired performance parameters, based at least in part on one or more updated network performance metrics, thereby replacing or augmenting the at least one first network resource provided from the one or more first networks of the first set of networks.

In some embodiments, the desired performance parameters might comprise at least one of a maximum latency, a maximum jitter, or a maximum packet loss, and/or the like. Alternatively, or additionally, the desired performance parameters might comprise at least one of performance parameters defined in a service level agreement ("SLA") associated with the customer or performance parameters defined in terms of natural resource usage, and/or the like. According to some embodiments, each of the one or more network performance metrics and the one or more updated network performance metrics might comprise at least one of quality of service ("QoS") measurement data, platform resource data and metrics, service usage data, topology and reference data, historical network data, or network usage trend data, and/or the like. Alternatively, or additionally, each of the one or more network performance metrics and the one or more updated network performance metrics might comprise one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

In some instances, the determination that the one or more first networks is capable of providing network resources each having the desired performance parameters might be based on one or more network performance metrics of the one or more first networks at the time that the request for network services from a customer is received. In some cases, determining whether at least one first network of the one or more first networks can no longer provide at least one first network resource having the desired performance parameters might comprise determining whether at least one first network of the one or more first networks can no longer provide at least one first network resource having the desired performance parameters, based at least in part on one or more network performance metrics of at least one of the one or more first networks, the at least one second network, the first set of networks, or the second set of networks. According to some embodiments, the second set of networks is different from the first set of networks by at least one network. In some cases, the at least one second network is different from each of the one or more first networks.

In some embodiments, the set of instructions, when executed by the at least one processor, further causes the computing system to, based on a determination that there is a conflict between at least one third network of the one or more first networks and at least one fourth network of the one or more first networks, in terms of providing the requested network services to the customer, stop allocation of one of at least one third network resource provided by the at least one third network or at least one fourth network resource provided by the at least one fourth network, and allocate at least one fifth network resource provided by at least one fifth network for supplementing provision of the requested network services having the desired performance parameters, based at least in part on one or more further updated network performance metrics. The at least one fifth network might be part of one of the first set of networks, the second set of networks, or a third set of networks that is separate from either the first set of networks or the second set of networks.

According to some embodiments, the set of instructions, when executed by the at least one processor, further causes the computing system to, based at least in part on one or more of time of day usage data, day of week usage data, or peak usage data of each of at least one sixth network resource provided by at least one sixth network of the one or more first networks and at least one seventh network resource provided by at least one seventh network, stop allocation of the at least one sixth network resource provided by the at least one sixth network, and allocate the at least one seventh network resource provided by at least one seventh network for supplementing provision of the requested network services having the desired performance parameters, based at least in part on one or more further updated network performance metrics. The at least one seventh network might be part of one of the first set of networks, the second set of networks, or a third set of networks that is separate from either the first set of networks or the second set of networks.

Merely by way of example, in some embodiments, allocating one or more network resources from one or more first networks of a first set of networks for providing the requested network services might comprise providing the one or more first networks with access to one or more virtual network functions ("VNFs") for use by the customer, the one or more VNFs providing the one or more network resources having the desired performance parameters. In some instances, providing access to the one or more VNFs might comprise bursting, using an application programming interface ("API"), one or more VNFs to one or more network functions virtualization ("NFV") entities at the one or more first networks. Likewise, in some embodiments, allocating at least one second network resource from at least one second network of a second set of networks for supplementing provision of the requested network services might comprise providing the at least one second network with access to one or more VNFs for use by the customer, the one or more VNFs providing the at least one second network resource having the desired performance parameters. In some cases, providing access to the one or more VNFs comprises bursting, using an API, one or more VNFs to one or more NFV entities at the at least one second network.

According to some embodiments, determining, with the computing system, whether at least one first network of the one or more first networks can no longer provide at least one first network resource, of the one or more network resources, having the desired performance parameters, based at least in part on one or more network performance metrics, might be performed in one of a real-time manner, a periodic manner, a per-request manner, or a random manner. In some embodiments, the network might be a software defined network ("SDN").

Various modifications and additions can be made to the embodiments discussed without departing from the scope of the invention. For example, while the embodiments described above refer to particular features, the scope of this invention also includes embodiments having different combination of features and embodiments that do not include all of the above described features.

A "container" might refer to a virtual construct that is similar to a virtual machine, except that, in some embodiments, containers (within a host computing system) share the same operating system, and thus do not need to run multiple instances of the operating system (as in the case of VMs in a host computing system). Accordingly, containers may be smaller in size and may be more efficient to run compared with VMs or hypervisors.

An "application programming interface" ("API") might refer to a protocol intended to be used as an interface by software components to communicate with each other.

"Virtualization" might refer to a process of mapping hardware resources to create "virtual machine resource" within the framework of the VMs so that the VM environment may utilize the hardware resources.

Specific Exemplary Embodiments

We now turn to the embodiments as illustrated by the drawings. FIGS. 1-5 illustrate some of the features of the method, system, and apparatus for implementing intent-based network services orchestration, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1B:
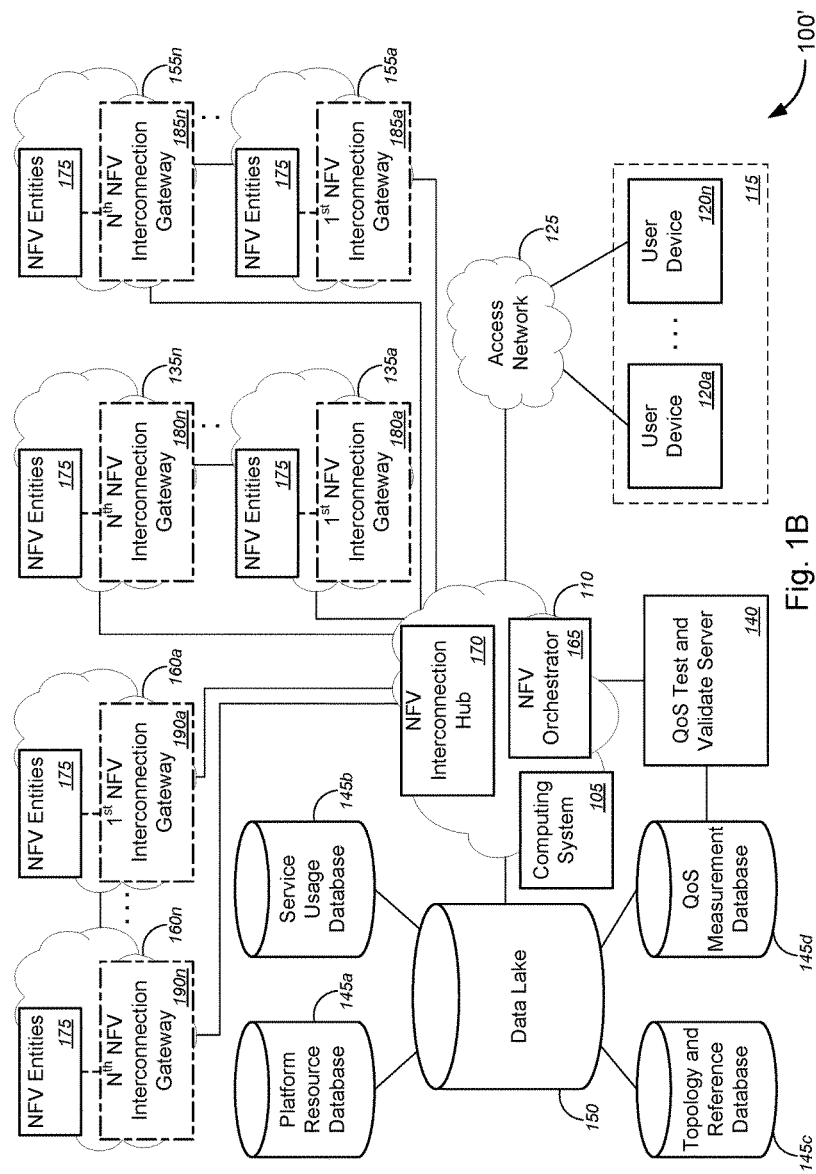

With reference to the figures, FIGS. 1A and 1B (collectively, "FIG. 1") are schematic diagrams illustrating various systems for implementing intent-based network services orchestration, in accordance with various embodiments.

In the non-limiting embodiment of FIG. 1A, system 100 might comprise a computing system 105 in service provider network 110. The computing system 105 might receive (either via wired or wireless connection) a request for network services from a customer 115, via one or more user devices 120a-120n (collectively, "user devices 120"), via access network 125. The one or more user devices 120 might include, without limitation, at least one of a smart phone, a mobile phone, a tablet computer, a laptop computer, a desktop computer, and/or the like. The request for network services might include desired performance parameters for the requested network services, without information regarding any of specific hardware, specific hardware type, specific location, or specific network for providing the requested network services. The desired performance parameters, in some embodiments, might include, but is not limited to, at least one of a maximum latency, a maximum jitter, or a maximum packet loss, and/or the like. Alternatively, or additionally, the desired performance parameters might include, without limitation, at least one of performance parameters defined in a service level agreement ("SLA") associated with the customer or performance parameters defined in terms of natural resource usage, and/or the like.

The computing system 105 might allocate one or more network resources 130 from one or more first networks 135a-135n of a first set of networks 135 for providing the requested network services. System 100 further comprises quality of service test and validate server 140, which performs measurement and/or collection of network performance metrics for at least one of the one or more network resources 130 and/or the one or more first networks 135a-135n. In some cases, network performance metrics might include, without limitation, at least one of quality of service ("QoS") measurement data, platform resource data and metrics, service usage data, topology and reference data, historical network data, or network usage trend data, and/or the like. Alternatively, or additionally, network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like, which are described in greater detail in the '208, '280, and '309 applications, which have already been incorporated herein by reference in their entirety. In some cases, the network performance metrics might include operations, administration, and management ("OAM") data. OAM data and OAM functionality that may be implemented are described in detail in the '952, '085, and '000 applications, which have already been incorporated herein by reference in their entirety In some embodiments, computing system 105 might allocate one or more network resources 130 from one or more first networks 135a-135n of a first set of networks 135 for providing the requested network services, based at least in part on the desired performance parameters and/or based at least in part on a determination that the one or more first networks is capable of providing network resources each having the desired performance parameters. According to some embodiments, determination that the one or more first networks is capable of providing network resources each having the desired performance parameters is based on one or more network performance metrics of the one or more first networks at the time that the request for network services from a customer is received.

System 100 might further comprise one or more databases, including, but not limited to, a platform resource database 145a, a service usage database 145b, a topology and reference database 145c, a QoS measurement database 145d, and/or the like. The platform resource database 145a might collect and store data related or pertaining to platform resource data and metrics, or the like, while the service usage database 145b might collect and store data related or pertaining to service usage data or service profile data, and the topology and reference database 145c might collect and store data related or pertaining to topology and reference data. The QoS measurement database 145d might collect and store QoS data, network performance metrics, and/or results of the QoS test and validate process. Data stored in each of at least one of the platform resource database 145a, the service usage database 145b, the topology and reference database 145c, the QoS measurement database 145d, and/or the like, collected in data lake 150, and the collective data or selected data from the data lake 150 are used to perform optimization of network resource allocation (both physical and/or virtual) using the computing system 105 (and, in some cases, using an orchestration optimization engine (e.g., orchestration optimization engine 275 of FIG. 2), or the like).

In some embodiments, the computing system 105 might determine whether at least one first network 135 of the one or more first networks 135a-135n can no longer provide at least one first network resource 130, of the one or more network resources 130, having the desired performance parameters, based at least in part on one or more network performance metrics. Based on a determination that at least one first network can no longer provide at least one first network resource having the desired performance parameters, the computing system 105 might allocate at least one second network resource 130 from one or more second networks 155a-155n of a second set of networks 155 for supplementing provision of the requested network services having the desired performance parameters, in some cases, based at least in part on one or more updated network performance metrics, thereby replacing or augmenting the at least one first network resource 130 provided from the one or more first networks 135a-135n of the first set of networks 135.

According to some embodiments, the computing system 105 might determine whether there is a conflict between at least one third network of the one or more first networks 135a-135n and at least one fourth network of the one or more first networks 135a-135n, in terms of providing the requested network services to the customer. Based on a determination that there is a conflict between at least one third network of the one or more first networks and at least one fourth network of the one or more first networks, in terms of providing the requested network services to the customer, the computing system 105 might stop allocation of one of at least one third network resource 130 provided by the at least one third network or at least one fourth network resource 130 provided by the at least one fourth network, and might allocate at least one fifth network resource 130 provided by at least one fifth network for supplementing provision of the requested network services having the desired performance parameters, in some cases, based at least in part on one or more further updated network performance metrics. In some embodiments, the at least one fifth network might be part of one of the first set of networks 135, the second set of networks 155, or a third set of networks 160 (comprising one or more third networks 160a-160n) that is separate from either the first set of networks 135 or the second set of networks 155.

In some embodiments, the system 100 might track one or more of time of day usage data, day of week usage data, or peak usage data for each of at least one network of at least one of the one or more first networks 135a-135n, the one or more second networks 155a-155n, and/or the one or more third networks 160a-160n. Based at least in part on one or more of time of day usage data, day of week usage data, or peak usage data of each of at least one sixth network resource provided by at least one sixth network of the one or more first networks and at least one seventh network resource provided by at least one seventh network, the computing system 105 might stop allocation of the at least one sixth network resource provided by the at least one sixth network, and might allocate the at least one seventh network resource provided by at least one seventh network for supplementing provision of the requested network services having the desired performance parameters, in some cases, based at least in part on one or more further updated network performance metrics. According to some embodiments, the at least one seventh network might be part of one of the first set of networks 135, the second set of networks 155, or the third set of networks 160 that is separate from either the first set of networks 135 or the second set of networks 155.

Although the first set of networks 135, the second set of networks 155, and the third set of networks 160 are shown as separate sets of networks in system 100 of FIG. 1A, the various embodiments are not so limited, and there may be overlap of networks across the two or more of the three sets of networks 135, 155, and 160. In some cases, two or more of the first set of networks 135, the second set of networks 155, and the third set of networks 160 might differ from each other by at least one network.

With reference to FIG. 1B, Network Functions Virtualization ("NFV") and virtual network functions ("VNFs") may be used to implement resource allocation for the intent-based services orchestration described herein. Implementation of NFV and VNFs, in general, and in specific other embodiments (i.e., non-intent-based services orchestration embodiments), is described in detail in the '695, '208, '280, and '309 applications, which have already been incorporated herein by reference in their entirety. System 100' of FIG. 1B is similar to system 100 of FIG. 1A, except that system 100' utilizes NFV and VNFs to implement the resource allocation for the intent-based services orchestration. In particular, system 100' further includes, without limitation, an NFV orchestrator 165 at service provider network 110 that handles or manages the NFV implementation and the provision of access of VNFs to one or more networks. A NFV interconnection hub 170 (which is described in detail in the '280 application) may be disposed at the service provider network 110, and might coordinate a plurality of NFV interconnection gateways 180a-180n, 185a-185n, and 190a-190, that are each disposed at a network of the plurality of networks 135a-135n, 155a-155n, and 160a-160n, respectively. Each network of the plurality of networks 135a-135n, 155a-155n, and 160a-160n might also comprise one or more NFV entities 175.

According to some embodiments, the allocation of network resources 170, as described with reference to FIG. 1A, might be accomplished via the computing system 105 communicating with the NFV orchestrator 165, which via the NFV interconnection hub 170 and via one or more of the NFV interconnection gateways 180-190, providing at least one of the one or more first networks 135a-135n, the one or more second networks 155a-155n, and/or the one or more third networks 160a-160n with access to one or more VNFs for use by the customer, the one or more VNFs providing the one or more network resources having the desired performance parameters. In some embodiments, providing access to the one or more VNFs comprises bursting, using an application programming interface ("API"), one or more VNFs to one or more NFV entities 175 at the at least one of the one or more first networks 135a-135n, the one or more second networks 155a-155n, and/or the one or more third networks 160a-160n.

The embodiment of system 100' of FIG. 1B is otherwise the same as, or similar to, the embodiment of system 100 of FIG. 1A, and similar descriptions apply to the embodiment of system 100' of FIG. 1B.

Figure 2A:
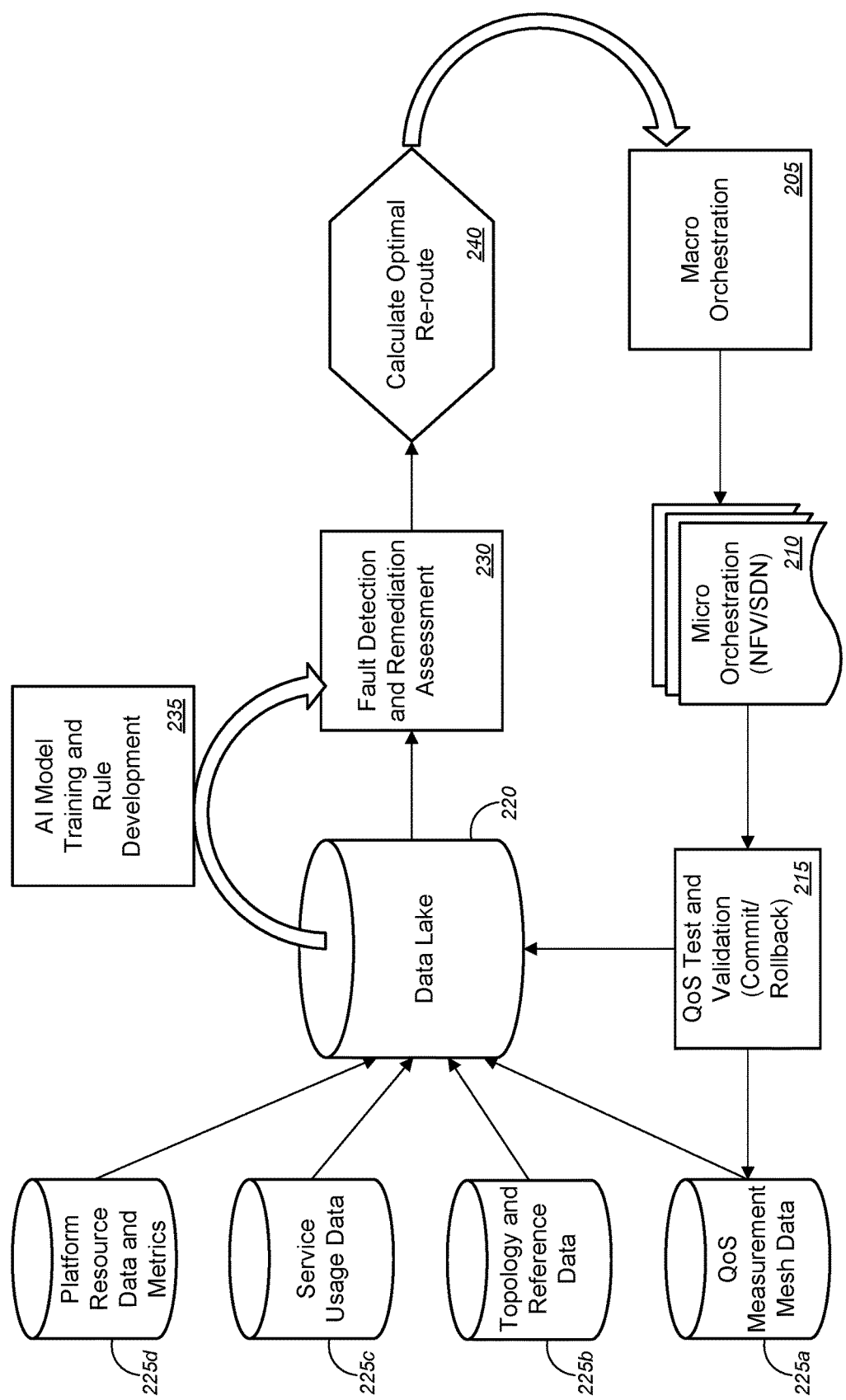
FIGS. 2A and 2B are block diagrams illustrating various methods for implementing intent-based network services orchestration, in accordance with various embodiments.
Figure 2B:
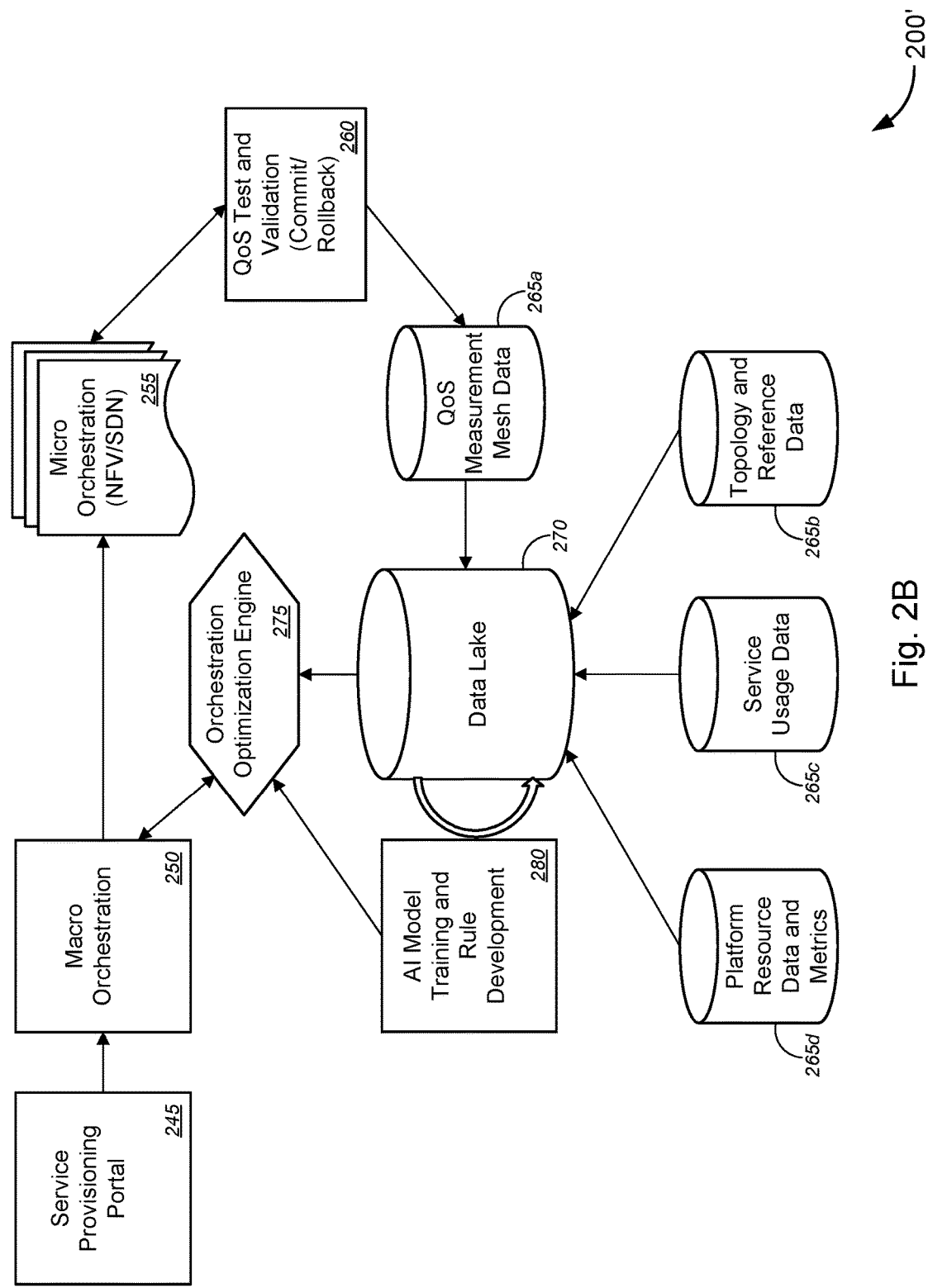

FIGS. 2A and 2B (collectively, "FIG. 2") are block diagrams illustrating various methods 200 and 200' for implementing intent-based network services orchestration, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 2 can be implemented by or with (and, in some cases, are described below with respect to) the systems 100 and 100' of FIGS. 1A and 1B, respectively (or components thereof), such methods may also be implemented using any suitable hardware (or software) implementation. Similarly, while each of the systems 100 and 100' of FIGS. 1A and 1B, respectively (or components thereof), can operate according to the method illustrated by FIG. 2 (e.g., by executing instructions embodied on a computer readable medium), the systems 100 and 100' of FIGS. 1A and 1B can each also operate according to other modes of operation and/or perform other suitable procedures.

With reference to FIG. 2A, after receiving a request for network services from a customer (not shown)—the request for network services comprising desired performance parameters for the requested network services, without information regarding any of specific hardware, specific hardware type, specific location, or specific network for providing the requested network services [i.e., an "intent-based" request]—or to generally manage various networks (and optimization of such various networks), method 200 might comprise macro orchestration (at block 205) that manages micro orchestration (at block 210) that utilizes Network Functions Virtualization ("NFV"), software defined networks ("SDNs"), and/or the like to determine what physical and/or virtual network resources to allocate that meet the "intent" for network resources having the desired performance parameters, for use by the customer, and/or to generally manage and/or optimize the various networks (that are under the control of the macro orchestrator or micro orchestrator).

Method 200 might further comprise performing quality of service ("QoS") testing and validation (at block 215) to commit to, or rollback from, the allocated network resources. The results of the QoS testing and validation (from block 215) are subsequently stored in data lake 220, as well as in QoS measurement mesh data database 225*a*. Data stored in each of at least one of the QoS measurement mesh data database 225*a*, topology and reference data database 225*b*, service usage data database 225*c*, and platform resource data and metrics database 225*d* are collected in data lake 220, and the collective data or selected data from the data lake 220 are used to perform fault detection and remediation assessment (at block 230). In some cases, the collective data or selected data from the data lake 220 are used by an artificial intelligence ("AI") model training and rule development process (at block 235) as a way to detect fault and to assess remediation. Method 200 might further comprise calculating optimal re-routing taking into account one or more of the collected data, the AI model training and rule development, the fault detection and remediation assessment, and/or the QoS testing and validation results. Method 200 subsequently loops back to macro orchestration (at block 205), and the process at blocks 205-240 repeat continually in a feedback loop-driven process to optimize allocation of network resources for meeting the desired performance parameters, as set out by the customer's "intent-based" request for network services, and/or for generally managing and/or optimizing the various networks.

In some embodiments, the service aware optimized orchestration as depicted in FIG. 2A may be implemented using collected feedback data that are processed in batches. Alternatively, the service aware optimized orchestration as depicted in FIG. 2A may be implemented using real-time streams of collected feedback data that are processed in real-time.

FIG. 2B depicts an alternative method 200' for implementing intent-based network services orchestration. In FIG. 2B, method 200' comprises providing a customer with access to a service provisioning portal (e.g., via software application ("app") that can be installed and run on a user device (including, but not limited to, a smart phone, a mobile phone, a laptop computer, a tablet computer, a desktop computer, and/or the like) that is associated with the user, via a web portal, and/or the like), and receiving, via the service provisioning portal, a request for network services from a customer (at block 245) [i.e., "activation" process]. The request for network services, as in the embodiment of FIG. 2A, might comprise desired performance parameters for the requested network services, without information regarding any of specific hardware, specific hardware type, specific location, or specific network for providing the requested network services [i.e., an "intent-based" request].

Method 200' might comprise macro orchestration (at block 250) that manages micro orchestration (at block 255) that utilizes Network Functions Virtualization ("NFV"), software defined networks ("SDNs"), and/or the like to determine what physical and/or virtual network resources to allocate that meet the "intent" for network resources having the desired performance parameters, for use by the customer, and/or to generally manage and/or optimize the various networks (that are under the control of the macro orchestrator or micro orchestrator). In some embodiments, macro orchestration (at block 250) might utilize orchestration optimization engine 275 to optimize management of micro orchestration.

Method 200' might further comprise performing quality of service ("QoS") testing and validation (at block 260) to commit to or rollback the allocated network resources. According to some embodiments, micro orchestration (at block 255) might utilize the results of the QoS testing and validation (from block 260) to immediately determine what physical and/or virtual network resources to allocate (or re-allocate) that meet the "intent" for network resources having the desired performance parameters, and/or to generally manage and/or optimize the various networks (that are under the control of the macro orchestrator or micro orchestrator).

In general, the results of the QoS testing and validation (from block 260) are subsequently stored in QoS measurement mesh data database 265*a*. Data stored in each of at least one of the QoS measurement mesh data database 265*a*, topology and reference data database 265*b*, service usage data database 265*c*, and platform resource data and metrics database 265*d* are collected in data lake 270, and the collective data or selected data from the data lake 270 are used to perform optimization of network resource allocation (both physical and/or virtual) using orchestration optimization engine 275. In some cases, the collective data or selected data from the data lake 270 are used by an AI model training and rule development process (at block 280) as a way to perform optimization of network resource allocation (both physical and/or virtual) using orchestration optimization engine 275. The AI model training and rule development process (at block 280) uses data from the data lake 270 to improve the AI model training and rule development, in a continuous feedback loop. Method 200' subsequently loops back to macro orchestration (at block 250), and the process at blocks 250-280 repeat continually in a feedback loop-driven process to optimize allocation of network resources (both physical and/or virtual) for meeting the desired performance parameters, as set out by the customer's "intent-based" request for network services.

In some embodiments, the service aware optimized orchestration as depicted in FIG. 2B may be implemented using collected feedback data that are processed in batches. Alternatively, the service aware optimized orchestration as depicted in FIG. 2B may be implemented using real-time streams of collected feedback data that are processed in real-time.

Figure 3A:
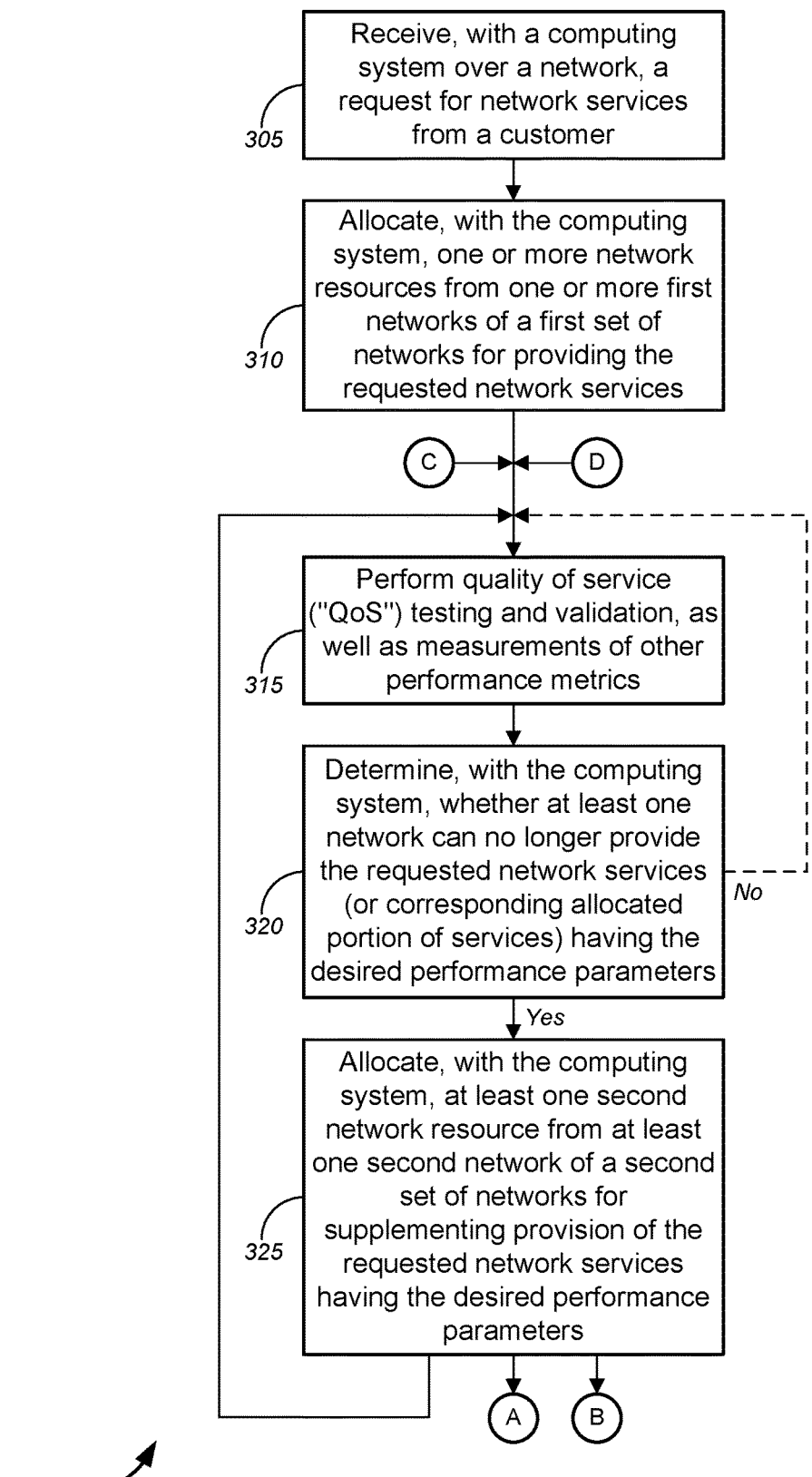
Figure 3D:
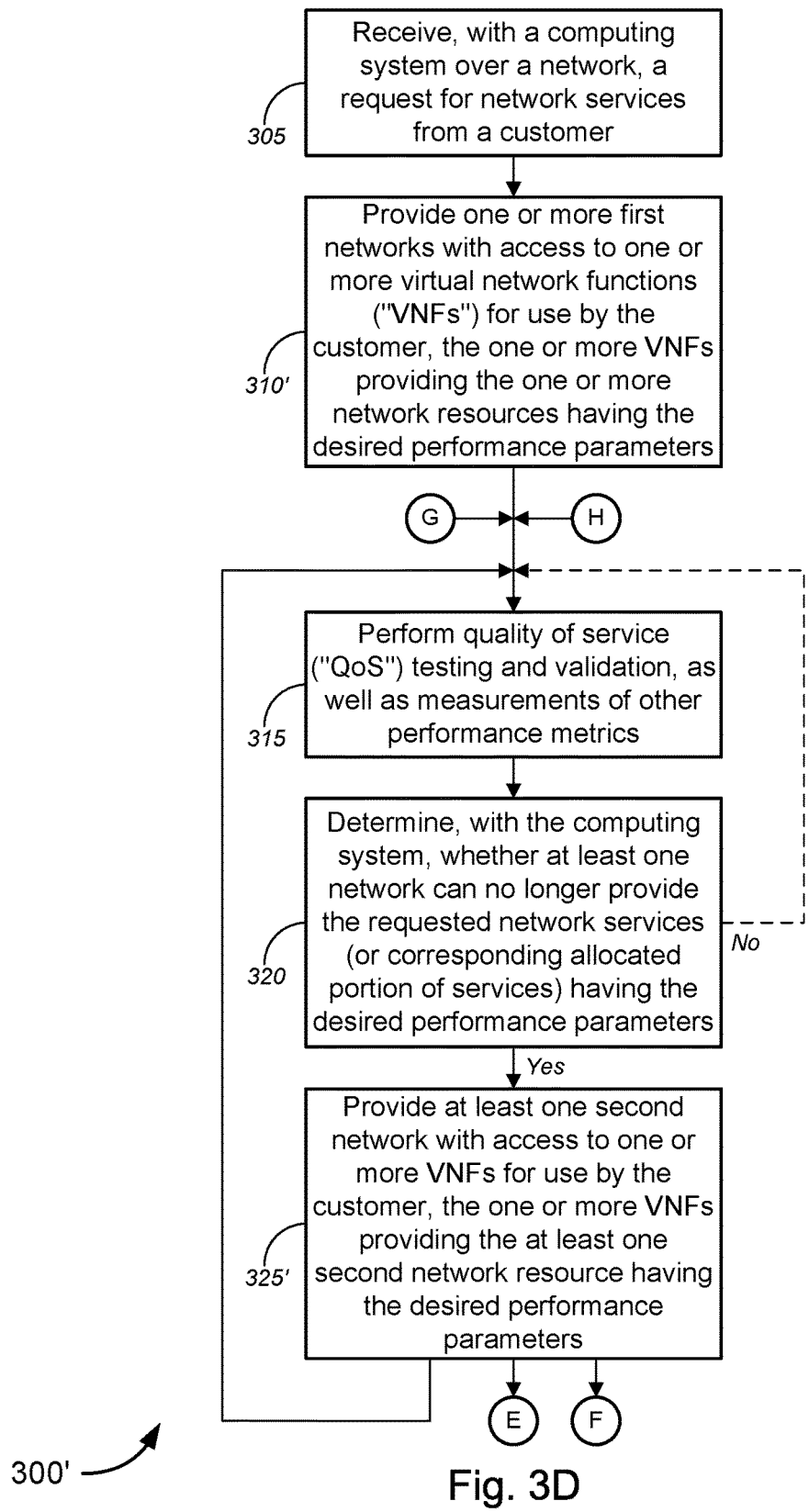

FIGS. 3A-3F (collectively, "FIG. 3") are flow diagrams illustrating various methods for implementing intent-based network services orchestration, in accordance with various embodiments. FIGS. 3A-3C depict a method 300 for implementing intent-based network services orchestration by allocating network resources (either physical or virtual) from one or more networks for providing requested network services, based on continually updated performance metrics of the networks. FIGS. 3D-3F depict an alternative method 300' for implementing intent-based network services orchestration by providing access to one or more virtual network functions ("VNFs") to one or more networks for providing requested network services, based on continually updated performance metrics of the networks.

With reference to FIG. 3, method 300 in FIG. 3A continues onto FIG. 3B, linked by the circular marker denoted by "A," continues from FIG. 3A onto FIG. 3C linked by the circular markers denoted by "B," returns back from FIG. 3B to FIG. 3A linked by the circular marker denoted "C," and returns back from FIG. 3C to FIG. 3A linked by the circular marker denoted "D." Method 300' in FIG. 3D (which is an alternative embodiment of Method 300 of FIG. 3A), similarly, continues onto FIG. 3E, linked by the circular marker denoted by "E," continues from FIG. 3D onto FIG. 3F linked by the circular markers denoted by "F," returns back from FIG. 3E to FIG. 3D linked by the circular marker denoted "G," and returns back from FIG. 3F to FIG. 3D linked by the circular marker denoted "H."

While the techniques and procedures are depicted and/or described in a certain order for purposes of illustration, it should be appreciated that certain procedures may be reordered and/or omitted within the scope of various embodiments. Moreover, while the method illustrated by FIG. 3 can be implemented by or with (and, in some cases, are described below with respect to) the systems 100, 100', 200, and 200' of FIGS. 1A, 1B, 2A, and 2B, respectively (or components thereof), such methods may also be implemented using any suitable hardware (or software) implementation. Similarly, while each of the systems 100, 100', 200, and 200' of FIGS. 1A, 1B, 2A, and 2B, respectively (or components thereof), can operate according to the method illustrated by FIG. 3 (e.g., by executing instructions embodied on a computer readable medium), the systems 100, 100', 200, and 200' of FIGS. 1A, 1B, 2A, and 2B can each also operate according to other modes of operation and/or perform other suitable procedures.

Turning to FIG. 3A, method 300 might comprise, at block 305, receiving, with a computing system over a network, a request for network services from a customer. The request for network services might comprise desired performance parameters for the requested network services, without information regarding any of specific hardware, specific hardware type, specific location, or specific network for providing the requested network services, or the like. In some embodiments, the desired performance parameters might include, without limitation, at least one of a maximum latency (including, but not limited to, 20 ms, or the like), a maximum jitter (including, but not limited to, 3 ms, or the like), or a maximum packet loss (including, but not limited to, 0-1% packet loss/discards, or the like), and/or the like. Alternatively, or additionally, the desired performance parameters might include, but is not limited to, at least one of performance parameters defined in a service level agreement ("SLA") associated with the customer or performance parameters defined in terms of natural resource usage, and/or the like. In one non-limiting example, a customer might send a request indicating desired deployment of a virtualized content delivery network ("vCDN") within (and maintaining) a maximum of 20 ms of latency, 0-1% packet loss or discards, and a maximum of 3 ms of jitter from a classless inter-domain routing ("CIDR") address or addresses XXX.xxx.XXX.xxx/27, XXX.xxx.XXX.xxx/20, and/or XXX.xxx.XXX.xxx/23, or the like. This non-limiting example request represents the "intent" of the customer to have a vCDN provided that meets the desired performance parameters of a maximum of 20 ms of latency, 0-1% packet loss or discards, and a maximum of 3 ms of jitter, without including in the request any information regarding any of specific hardware, specific hardware type, specific location, or specific network for providing the requested network services, or the like.

At block 310, method 300 might comprise allocating, with the computing system, one or more network resources from one or more first networks of a first set of networks for providing the requested network services, in some instances, based at least in part on the desired performance parameters and based at least in part on a determination that the one or more first networks is capable of providing network resources each having the desired performance parameters.

Method 300 might further comprise performing quality of service ("QoS") testing and validation and/or measurements of other performance metrics (block 315). The results of such QoS testing and validation and/or the other performance metrics may be stored in one or more databases (or data lakes), and might be used to (establish or) update the network performance metrics that in some embodiments are used as the basis for allocation of network resources (e.g., at block 310 above (in which case, the process at block 315 might be performed before the process of block 310 (not shown)) and/or block 325 below). In other words, in some cases, determination that the one or more first networks is capable of providing network resources each having the desired performance parameters (at block 310) is based on one or more network performance metrics of the one or more first networks at the time that the request for network services from a customer is received (i.e., before allocation of network resources from the one or more first networks). In some instances, determining whether at least one first network of the one or more first networks can no longer provide at least one first network resource having the desired performance parameters comprises determining, with the computing system, whether at least one first network of the one or more first networks can no longer provide at least one first network resource having the desired performance parameters, based at least in part on one or more network performance metrics of at least one of the one or more first networks, the at least one second network, the first set of networks, or the second set of networks (i.e., based on the results from the process at block 315 subsequent to allocation of network resources from the one or more first networks).

Method 300, at block 320, might comprise determining, with the computing system, whether at least one network (i.e., at least one first network of the one or more first networks, or other network) can no longer provide the requested network services (or corresponding allocated portion of services) having the desired performance parameters, in some cases, based at least in part on one or more network performance metrics. If so, the method 300 proceeds to block 325. If not, the method loops back to block 315 (and block 320) until it is determined that at least one network can no longer provide the requested network services (or corresponding allocated portion of services) having the desired performance parameters. According to some embodiments, each of the one or more network performance metrics and the one or more updated network performance metrics might include, without limitation, at least one of quality of service ("QoS") measurement data, platform resource data and metrics, service usage data, topology and reference data, historical network data, or network usage trend data, and/or the like. Alternatively, or additionally, each of the one or more network performance metrics and the one or more updated network performance metrics include, but are not limited to, one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like, which are described in greater detail in the '208, '280, and '309 applications, which have already been incorporated herein by reference in their entirety.

At block 325, method 320 might comprise, based on a determination that at least one network can no longer provide the requested network services (or corresponding allocated portion of services) having the desired performance parameters (e.g., based on a determination that at least one first network can no longer provide at least one first network resource having the desired performance parameters), allocating, with the computing system, at least one second network resource from at least one second network of a second set of networks for supplementing provision of the requested network services having the desired performance parameters, in some cases, based at least in part on one or more updated network performance metrics, thereby replacing or augmenting the at least one first network resource provided from the one or more first networks of the first set of networks. In some cases, the second set of networks is different from the first set of networks by at least one network, while, in other cases, the at least one second network is different from each of the one or more first networks. The method 300 subsequently proceeds to one of block 315, block 330 in FIG. 3B (following marker "A"), or block 345 in FIG. 3C (following marker "B").

In FIG. 3B (following marked "A" from FIG. 3A), method 300 might comprise, at optional block 330, determining, with the computing system, whether there is a conflict between at least one third network of the one or more first networks and at least one fourth network of the one or more first networks, in terms of providing the requested network services to the customer. If so, the method 300 proceeds to optional block 335. If not, the method loops back to block 315 in FIG. 3A (following marker "C"). For example, one particular content delivery network ("CDN") or virtual CDN ("vCDN") associated with one service provider might not run well next to software or hardware of another network that is associated with a different service provider, thereby giving rise to a conflict in terms of providing the requested network services (having the desired performance parameters) to the customer.

Method 300 might further comprise, based on a determination that there is a conflict between at least one third network of the one or more first networks and at least one fourth network of the one or more first networks, in terms of providing the requested network services to the customer, stopping, with the computing system, allocation of one of at least one third network resource provided by the at least one third network or at least one fourth network resource provided by the at least one fourth network (at optional block 335) and allocating, with the computing system, at least one fifth network resource provided by at least one fifth network for supplementing provision of the requested network services having the desired performance parameters, based at least in part on one or more further updated network performance metrics (at optional block 340). In some cases, the at least one fifth network is part of one of the first set of networks, the second set of networks, or a third set of networks that is separate from either the first set of networks or the second set of networks. Method 300 subsequently loops back to block 315 in FIG. 3A (following marker "C").

In FIG. 3C (following marked "B" from FIG. 3A), method 300 might comprise, at optional block 345, stopping, with the computing system, allocation of the at least one sixth network resource provided by the at least one sixth network, based at least in part on one or more of time of day usage data, day of week usage data, or peak usage data of each of at least one sixth network resource provided by at least one sixth network of the one or more first networks and at least one seventh network resource provided by at least one seventh network.

At optional block 350, method 300 might comprise allocating, with the computing system, the at least one seventh network resource provided by at least one seventh network for supplementing provision of the requested network services having the desired performance parameters, based at least in part on one or more further updated network performance metrics. In some cases, the at least one seventh network is part of one of the first set of networks, the second set of networks, or a third set of networks that is separate from either the first set of networks or the second set of networks. In particular, in some embodiments, the system (e.g., system 100 or 100' of FIG. 1A or 1B, respectively) might maintain awareness of the time of day, the day of week, and/or other variables for enhancing placement or allocation of network resources in the network, or placement or allocation of virtualized infrastructure into a service provider network. In one non-limiting example, a service provider's network may experience peak utilization during the hours of 5 p.m. and 9 p.m. between Mondays and Fridays (inclusively), which could enrich the continuing intent-based placement or allocation of network resources (in the embodiments of FIG. 3A) or the continuing intent-based placement or allocation of CDNs or vCDNs, providing caching services into all sites during peak utilization over 70% (of network capacity or the like) and to offload from backbone elements in a provider's network, or the like. Method 300 subsequently loops back to block 315 in FIG. 3A (following marker "D").

Turning to FIG. 3D, method 300' might comprise, at block 305, receiving, with a computing system over a network, a request for network services from a customer. The request for network services might comprise desired performance parameters for the requested network services, without information regarding any of specific hardware, specific hardware type, specific location, or specific network for providing the requested network services, or the like. In some embodiments, the desired performance parameters might include, without limitation, at least one of a maximum latency (including, but not limited to, 20 ms, or the like), a maximum jitter (including, but not limited to, 3 ms, or the like), or a maximum packet loss (including, but not limited to, 0-1% packet loss/discards, or the like), and/or the like. Alternatively, or additionally, the desired performance parameters might include, but is not limited to, at least one of performance parameters defined in a service level agreement ("SLA") associated with the customer or performance parameters defined in terms of natural resource usage, and/or the like. In one non-limiting example, a customer might send a request indicating desired deployment of a virtualized content delivery network ("vCDN") within (and maintaining) a maximum of 20 ms of latency, 0-1% packet loss or discards, and a maximum of 3 ms of jitter from a classless inter-domain routing ("CIDR") address or addresses XXX.xxx.XXX.xxx/27, XXX.xxx.XXX.xxx/20, and/or XXX.xxx.XXX.xxx/23, or the like. This non-limiting example request represents the "intent" of the customer to have a vCDN provided that meets the desired performance parameters of a maximum of 20 ms of latency, 0-1% packet loss or discards, and a maximum of 3 ms of jitter, without including in the request any information regarding any of specific hardware, specific hardware type, specific location, or specific network for providing the requested network services, or the like.

At block 310', method 300' might comprise providing one or more first networks of a first set of networks with access to one or more first virtual network functions ("VNFs") for use by the customer, in some instances, based at least in part on the desired performance parameters (and in some cases, based at least in part on a determination that the one or more first networks is capable of providing network resources each having the desired performance parameters). The one or more first VNFs might provide the one or more network resources having the desired performance parameters.

Method 300' might further comprise performing quality of service ("QoS") testing and validation and/or measurements of other performance metrics (block 315). The results of such QoS testing and validation and/or the other performance metrics may be stored in one or more databases (or data lakes), and might be used to (establish or) update the network performance metrics that in some embodiments might be used as the basis for providing a network with access to one or more (first) VNFs for use by the customer (e.g., at block 310' above (in which case, the process at block 315 might be performed before the process of block 310' (not shown)) and/or block 325' below). In other words, in some cases, determination that the one or more first networks is capable of providing network resources each having the desired performance parameters (at block 310') is based on one or more network performance metrics of the one or more first networks at the time that the request for network services from a customer is received (i.e., before allocation of network resources from the one or more first networks). In some instances, determining whether at least one first network of the one or more first networks can no longer provide at least one first network resource having the desired performance parameters comprises determining, with the computing system, whether at least one first network of the one or more first networks can no longer provide at least one first network resource (including at least one first VNF of the one or more first VNFs) having the desired performance parameters, based at least in part on one or more network performance metrics of at least one of the one or more first networks, the at least one second network, the first set of networks, or the second set of networks (i.e., based on the results from the process at block 315 subsequent to allocation of network resources from the one or more first networks).

Method 300', at block 320, might comprise determining, with the computing system, whether at least one network (i.e., at least one first network of the one or more first networks, or other network) can no longer provide the requested network services (or corresponding allocated portion of services), including at least one first VNF of the one or more first VNFs, having the desired performance parameters, in some cases, based at least in part on one or more network performance metrics. If so, the method 300' proceeds to block 325'. If not, the method loops back to block 315 (and block 320) until it is determined that at least one network can no longer provide the requested network services (or corresponding allocated portion of services), including at least one first VNF of the one or more first VNFs, having the desired performance parameters. According to some embodiments, each of the one or more network performance metrics and the one or more updated network performance metrics might include, without limitation, at least one of quality of service ("QoS") measurement data, platform resource data and metrics, service usage data, topology and reference data, historical network data, or network usage trend data, and/or the like. Alternatively, or additionally, each of the one or more network performance metrics and the one or more updated network performance metrics include, but are not limited to, one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like, which are described in greater detail in the '208, '280, and '309 applications, which have already been incorporated herein by reference in their entirety. Network Functions Virtualization ("NFV") and VNFs are described in detail with respect to the '695, '208, '280, and '309 applications.

At block 325', method 320 might comprise, based on a determination that at least one network can no longer provide the requested network services (or corresponding allocated portion of services), including at least one first VNF of the one or more first VNFs, having the desired performance parameters (e.g., based on a determination that at least one first network can no longer provide at least one first network resource, or at least one first VNF, having the desired performance parameters), providing at least one second network of a second set of networks with access to one or more second VNFs for use by the customer (and, in some instances, for supplementing provision of the requested network services having the desired performance parameters), in some cases, based at least in part on one or more updated network performance metrics, thereby replacing or augmenting the at least one first network resource provided from the one or more first networks of the first set of networks. In some embodiments, the one or more second VNFs might be different from the one or more first VNFs, and might provide the one or more network resources having the desired performance parameters. According to some embodiments, at least one second VNF of the one or more second VNFs is the same as (or similar to) at least one first VNF of the one or more VNFs, and might provide the one or more network resources (or at least a corresponding portion of the one or more network resources) having the desired performance parameters. In some cases, the second set of networks is different from the first set of networks by at least one network, while, in other cases, the at least one second network is different from each of the one or more first networks. The method 300' subsequently proceeds to one of block 315, block 330 in FIG. 3E (following marker "E"), or block 345' in FIG. 3F (following marker "F").

In FIG. 3E (following marked "E" from FIG. 3D), method 300' might comprise, at optional block 330, determining, with the computing system, whether there is a conflict between at least one third network of the one or more first networks and at least one fourth network of the one or more first networks, in terms of providing the requested network services to the customer. If so, the method 300' proceeds to optional block 335'. If not, the method loops back to block 315 in FIG. 3D (following marker "G"). For example, one particular content delivery network ("CDN") or virtual CDN ("vCDN") associated with one service provider might not run well next to software or hardware of another network that is associated with a different service provider, thereby giving rise to a conflict in terms of providing the requested network services (having the desired performance parameters) to the customer.

Method 300' might further comprise, based on a determination that there is a conflict between at least one third network of the one or more first networks and at least one fourth network of the one or more first networks, in terms of providing the requested network services to the customer, stopping providing one of the at least one third network or the at least one fourth network with access to at least one VNF (of the one or more first VNFs or of the one or more second VNFs) (at optional block 335') and providing at least one fifth network with access to at least one third VNF for supplementing provision of the requested network services having the desired performance parameters, in some cases, based at least in part on one or more further updated network performance metrics (at optional block 340'). According to some embodiments, the at least one third VNF is the same (or similar) to one or more of the at least one first VNF or the at least one second VNF. In some cases, the at least one fifth network is part of one of the first set of networks, the second set of networks, or a third set of networks that is separate from either the first set of networks or the second set of networks. Method 300' subsequently loops back to block 315 in FIG. 3D (following marker "G").

In FIG. 3F (following marked "F" from FIG. 3D), method 300' might comprise, at optional block 345', stopping providing at least one sixth network with access to at least one fourth VNF, based at least in part on one or more of time of day usage data, day of week usage data, or peak usage data of each of at least one sixth network resource provided by at least one sixth network of the one or more first networks (or such data of the at least one fourth VNF) and at least one seventh network resource provided by at least one seventh network (or such data of at least one fifth VNF). Each of the at least one fourth VNF or the at least one fifth VNF might be the same (or similar) to one or more of the at least one first VNF or the at least one second VNF.

At optional block 350', method 300' might comprise providing the at least one seventh network with access to the at least one fifth VNF for use by the customer, for supplementing provision of the requested network services having the desired performance parameters, in some cases, based at least in part on one or more further updated network performance metrics. In some cases, the at least one seventh network is part of one of the first set of networks, the second set of networks, or a third set of networks that is separate from either the first set of networks or the second set of networks. In particular, in some embodiments, the system (e.g., system 100 or 100' of FIG. 1A or 1B, respectively) might maintain awareness of the time of day, the day of week, and/or other variables for enhancing placement of, or provision of access to, network resources (including, without limitation, VNFs) in the network, or placement of, or provision of access to, virtualized infrastructure (including, without limitation, VNFs) into a service provider network.

In one non-limiting example, a service provider's network may experience peak utilization during the hours of 5 p.m. and 9 p.m. between Mondays and Fridays (inclusively), which could enrich the continuing intent-based placement or allocation of network resources (in the embodiments of FIG. 3D) or the continuing intent-based placement or allocation of CDNs or vCDNs, providing caching services into all sites during peak utilization over 70% (of network capacity or the like) and to offload from backbone elements in a provider's network, or the like. According to some embodiments, having historical trends could also allow for placement of services (or provision of access) to prevent network degradation by scale-out of existing virtual infrastructure systems or deploying additional virtualized infrastructure systems or optimization of the network to augment capacity (e.g., in a bandwidth-on-demand ("BoD")-type manner, or the like) or software-defined network ("SDN") controller calls, or the like. A feedback loop system (such as shown and described with respect to FIG. 3) can provide a facility for tracking performance characteristics of various services and how they interact with one another on the same compute or network paths. In one non-limiting example, some VNFs may not reside well with other VNFs on the same kernel-based virtual machine ("KVM") compute or Linux container environment, e.g., based on historical indicators of necessary re-deployment due to congestion or bursty co-tenant behavior. In another non-limiting example, a bursty or chatty broadcast (or L2) communications or routing loops within a split-horizon network topology may trigger network optimization to occur by making calls into SDN controllers, where adjustments may be made to behavior of split-horizon to not carry specific flows from endpoints in the network to prohibit, drop, and/or throttle the traffic, based on policies or counter increments, or the like. Method 300' subsequently loops back to block 315 in FIG. 3D (following marker "H").

In the embodiments of FIGS. 3D-3F, in some instances, providing access to one or more VNFs might include, without limitation, bursting, using an application programming interface ("API"), one or more VNFs to one or more network functions virtualization ("NFV") entities at the particular one or more networks (e.g., at least one of first through seventh networks, or the like). Bursting of VNFs is described in greater detail in the '208, '280, and '309 applications, which have already been incorporated herein by reference in their entirety.

With respect to the embodiments of FIGS. 1-3, although not specifically described, the process of determining whether the networks can, or can no longer, provide network resources having the desired performance parameters, as well as the processes of allocating and re-allocating physical and/or virtual network resources (or VNFs) are performed automatically or autonomously and continuously (via the feedback loop system), thereby ensuring optimized network resource allocation and utilization, while ensuring that the customers' intended/desired performance parameters are met.

Exemplary System and Hardware Implementation

Figure 4:
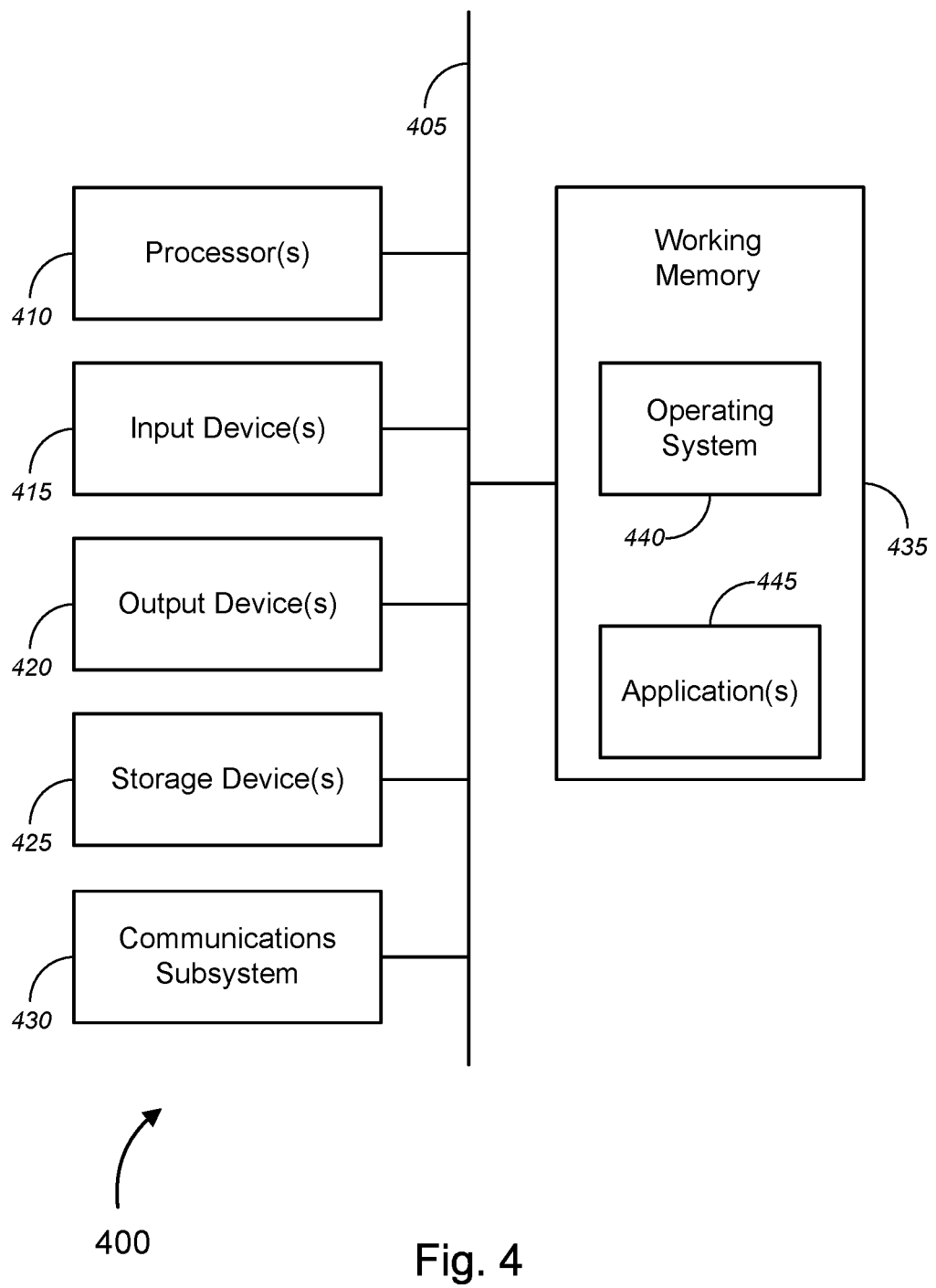
FIG. 4 is a block diagram illustrating an exemplary computer or system hardware architecture, in accordance with various embodiments.

FIG. 4 is a block diagram illustrating an exemplary computer or system hardware architecture, in accordance with various embodiments. FIG. 4 provides a schematic illustration of one embodiment of a computer system 400 of the service provider system hardware that can perform the methods provided by various other embodiments, as described herein, and/or can perform the functions of computer or hardware system (i.e., computing system 105, server 140, interconnection gateway devices 180-190, interconnection hub devices 170, NFV entities 175, etc.), or of any other device (e.g., user devices 120, etc.), as described above. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer or hardware system 400—which might represent an embodiment of the computer or hardware system (i.e., computing system 105, server 140, interconnection gateway devices 180-190, interconnection hub devices 170, NFV entities 175, etc.), or of any other device (e.g., user devices 120, etc.), described above with respect to FIGS. 1-3—is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, and/or the like); one or more input devices 415, which can include, without limitation, a mouse, a keyboard and/or the like; and one or more output devices 420, which can include, without limitation, a display device, a printer, and/or the like.

The computer or hardware system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 400 might also include a communications subsystem 430, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer or hardware systems, and/or with any other devices described herein. In many embodiments, the computer or hardware system 400 will further comprise a working memory 435, which can include a RAM or ROM device, as described above.

The computer or hardware system 400 also may comprise software elements, shown as being currently located within the working memory 435, including an operating system 440, device drivers, executable libraries, and/or other code, such as one or more application programs 445, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 400 and/or might take the form of source and/or installable code, which, upon compilation and/or installation on the computer or hardware system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 400) to perform methods in accordance with various embodiments of the invention. According to a set of embodiments, some or all of the procedures of such methods are performed by the computer or hardware system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 400, various computer readable media might be involved in providing instructions/code to processor(s) 410 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 425. Volatile media includes, without limitation, dynamic memory, such as the working memory 435. In some alternative embodiments, a computer readable medium may take the form of transmission media, which includes, without limitation, coaxial cables, copper wire and fiber optics, including the wires that comprise the bus 405, as well as the various components of the communication subsystem 430 (and/or the media by which the communications subsystem 430 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
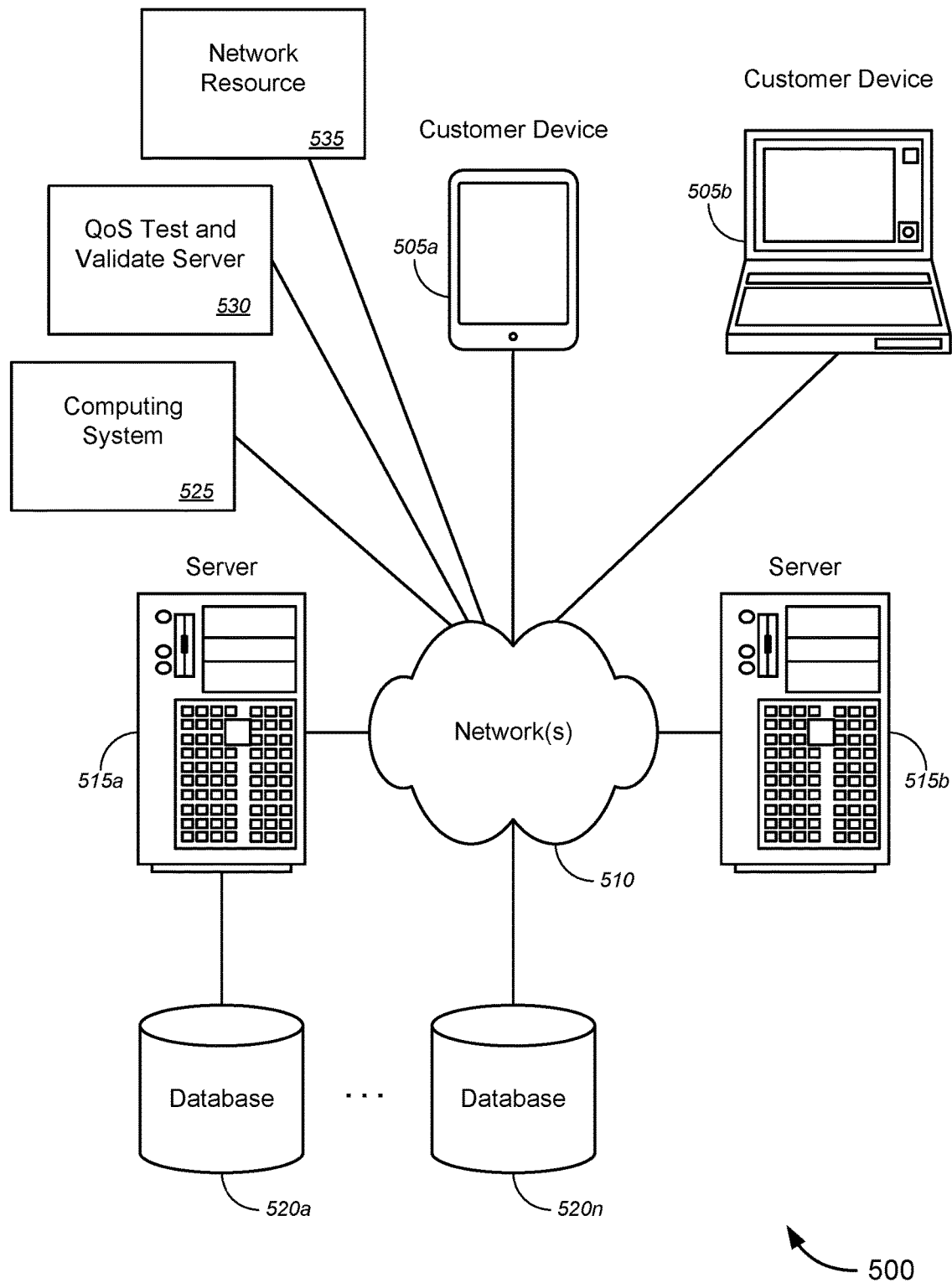
FIG. 5 is a block diagram illustrating a networked system of computers, computing systems, or system hardware architecture, which can be used in accordance with various embodiments.

As noted above, a set of embodiments comprises methods and systems for implementing intent-based network services orchestration. FIG. 5 illustrates a schematic diagram of a system 500 that can be used in accordance with one set of embodiments. The system 500 can include one or more user computers, user devices, or customer devices 505. A user computer, user device, or customer device 505 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 505 can also have any of a variety of applications, including one or more applications configured to perform methods provided by various embodiments (as described above, for example), as well as one or more office applications, database client and/or server applications, and/or web browser applications. Alternatively, a user computer, user device, or customer device 505 can be any other electronic device, such as a thin-client computer, Internet-enabled mobile telephone, and/or personal digital assistant, capable of communicating via a network (e.g., the network(s) 510 described below) and/or of displaying and navigating web pages or other types of electronic documents. Although the exemplary system 500 is shown with two user computers, user devices, or customer devices 505, any number of user computers, user devices, or customer devices can be supported.

Certain embodiments operate in a networked environment, which can include a network(s) 510. The network(s) 510 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 510 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 might be a data server, a web server, a cloud computing device(s), or the like, as described above. The data server might include (or be in communication with) a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more application servers, which can be configured with one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 505 and/or another server 515. In some embodiments, an application server can perform one or more of the processes for implementing intent-based network services orchestration, or the like, as described in detail above. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer, user device, or customer device 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520a-520n (collectively, "databases 520"). The location of each of the databases 520 is discretionary: merely by way of example, a database 520a might reside on a storage medium local to (and/or resident in) a server 515a (and/or a user computer, user device, or customer device 505). Alternatively, a database 520n can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle database, that is adapted to store, update, and retrieve data in response to SQL-formatted commands. The database might be controlled and/or maintained by a database server, as described above, for example.

According to some embodiments, system 500 might further comprise a computing system(s) 525 (similar to computing system 105 of FIG. 1, or the like), a quality of service ("QoS") test and validate server(s) 530 (similar to QoS test and validate server 140 of FIG. 1, or the like), and/or one or more network resources 535, as described in detail above with respect to FIGS. 1-3. In some embodiments, one or both of the computing system(s) 525 or the QoS test and validate server(s) 530 might be embodied by, or might have functionalities similar to those of, servers 515a or 515b. In some cases, network resources 535 might be in the form of Virtual Network Functions ("VNFs") that are made accessible to one or more customer devices or one or more networks (for access by the one or more customer devices), as described in detail above with respect to FIGS. 1-3.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, with a computing system over a network, a request for network services from a customer, the request for network services comprising desired performance parameters for the requested network services, without information regarding any of specific hardware, specific hardware type, specific location, or specific network for providing the requested network services;

allocating, with the computing system, one or more network resources from one or more first networks of a first set of networks for providing the requested network services, based at least in part on the desired performance parameters and based at least in part on a determination that the one or more first networks is capable of providing network resources each having the desired performance parameters;

determining, with the computing system, whether at least one first network of the one or more first networks can no longer provide at least one first network resource, of the one or more network resources, having the desired performance parameters, based at least in part on one or more network performance metrics;

based on a determination that at least one first network can no longer provide at least one first network resource having the desired performance parameters, allocating, with the computing system, at least one second network resource from at least one second network of a second set of networks for supplementing provision of the requested network services having the desired performance parameters, based at least in part on one or more updated network performance metrics, thereby replacing or augmenting the at least one first network resource provided from the one or more first networks of the first set of networks; and based on a determination that there is a conflict between at least one third network of the one or more first networks and at least one fourth network of the one or more first networks, in terms of providing the requested network services to the customer, stopping, with the computing system, allocation of one of at least one third network resource provided by the at least one third network or at least one fourth network resource provided by the at least one fourth network, and allocating, with the computing system, at least one fifth network resource provided by at least one fifth network for supplementing provision of the requested network services having the desired performance parameters, based at least in part on one or more further updated network performance metrics;

wherein the at least one fifth network is part of one of the first set of networks, the second set of networks, or a third set of networks that is separate from either the first set of networks or the second set of networks.

2. The method of claim 1, wherein the second set of networks is different from the first set of networks by at least one network.

3. The method of claim 2, wherein the at least one second network is different from each of the one or more first networks.

4. The method of claim 1, wherein allocating one or more network resources from one or more first networks of a first set of networks for providing the requested network services comprises providing the one or more first networks with access to one or more virtual network functions ("VNFs") for use by the customer, the one or more VNFs providing the one or more network resources having the desired performance parameters.

5. The method of claim 4, wherein providing access to the one or more VNFs comprises bursting, using an application programming interface ("API"), one or more VNFs to one or more network functions virtualization ("NFV") entities at the one or more first networks.

6. The method of claim 1, wherein allocating at least one second network resource from at least one second network of a second set of networks for supplementing provision of the requested network services comprises providing the at least one second network with access to one or more virtual network functions ("VNFs") for use by the customer, the one or more VNFs providing the at least one second network resource having the desired performance parameters.

7. The method of claim 6, wherein providing access to the one or more VNFs comprises bursting, using an application programming interface ("API"), one or more VNFs to one or more network functions virtualization ("NFV") entities at the at least one second network.

8. The method of claim 1, wherein the desired performance parameters comprise at least one of a maximum latency, a maximum jitter, or a maximum packet loss.

9. The method of claim 1, wherein the desired performance parameters comprise at least one of performance parameters defined in a service level agreement ("SLA") associated with the customer or performance parameters defined in terms of natural resource usage.

10. The method of claim 1, wherein each of the one or more network performance metrics and the one or more updated network performance metrics comprise at least one of quality of service ("QoS") measurement data, platform resource data and metrics, service usage data, topology and reference data, historical network data, or network usage trend data.

11. The method of claim 1, wherein each of the one or more network performance metrics and the one or more updated network performance metrics comprise one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS").

12. The method of claim 1, wherein the determination that the one or more first networks is capable of providing network resources each having the desired performance parameters is based on one or more network performance metrics of the one or more first networks at the time that the request for network services from a customer is received.

13. The method of claim 1, wherein determining whether at least one first network of the one or more first networks can no longer provide at least one first network resource having the desired performance parameters comprises determining, with the computing system, whether at least one first network of the one or more first networks can no longer provide at least one first network resource having the desired performance parameters, based at least in part on one or more network performance metrics of at least one of the one or more first networks, the at least one second network, the first set of networks, or the second set of networks.

14. The method of claim 1, further comprising:
based at least in part on one or more of time of day usage data, day of week usage data, or peak usage data of each of at least one sixth network resource provided by at least one sixth network of the one or more first networks and at least one seventh network resource provided by at least one seventh network, stopping, with the computing system, allocation of the at least one sixth network resource provided by the at least one sixth network, and allocating, with the computing system, the at least one seventh network resource provided by at least one seventh network for supplementing provision of the requested network services having the desired performance parameters, based at least in part on one or more further updated network performance metrics;

wherein the at least one seventh network is part of one of the first set of networks, the second set of networks, or a third set of networks that is separate from either the first set of networks or the second set of networks.

15. The method of claim 1, wherein determining, with the computing system, whether at least one first network of the one or more first networks can no longer provide at least one first network resource, of the one or more network resources, having the desired performance parameters, based at least in part on one or more network performance metrics, is performed in one of a real-time manner, a periodic manner, a per-request manner, or a random manner.

16. A computing system, comprising:
at least one processor; and
at least one non-transitory computer readable medium communicatively coupled to the at least one processor, the at least one non-transitory computer readable medium having stored thereon computer software comprising a set of instructions that, when executed by the at least one processor, causes the computing system to:
receive, over a network, a request for network services from a customer, the request for network services comprising desired performance parameters for the requested network services, without information regarding any of specific hardware, specific hardware type, specific location, or specific network for providing the requested network services;

allocate one or more network resources from one or more first networks of a first set of networks for providing the requested network services, based at least in part on the desired performance parameters and based at least in part on a determination that the one or more first networks is capable of providing network resources each having the desired performance parameters;

determine whether at least one first network of the one or more first networks can no longer provide at least one first network resource, of the one or more network resources, having the desired performance parameters, based at least in part on one or more network performance metrics;

based on a determination that at least one first network can no longer provide at least one first network resource having the desired performance parameters, allocate at least one second network resource from at least one second network of a second set of networks for supplementing provision of the requested network services having the desired performance parameters, based at least in part on one or more updated network performance metrics, thereby replacing or augmenting the at least one first network resource provided from the one or more first networks of the first set of networks; and based on a determination that there is a conflict between at least one third network of the one or more first networks and at least one fourth network of the one or more first networks, in terms of providing the requested network services to the customer, stop allocation of one of at least one third network resource provided by the at least one third network or at least one fourth network resource provided by the at least one fourth network, and allocate at least one fifth network resource provided by at least one fifth network for supplementing provision of the requested network services having the desired performance parameters, based at least in part on one or more further updated network performance metrics;

wherein the at least one fifth network is part of one of the first set of networks, the second set of networks, or a third set of networks that is separate from either the first set of networks or the second set of networks.

17. The system of claim 16, wherein the second set of networks is different from the first set of networks by at least one network.

18. The system of claim 17, wherein the at least one second network is different from each of the one or more first networks.

19. The system of claim 16, wherein allocating one or more network resources from one or more first networks of a first set of networks for providing the requested network services comprises providing the one or more first networks with access to one or more virtual network functions ("VNFs") for use by the customer, the one or more VNFs providing the one or more network resources having the desired performance parameters.

20. The system of claim 19, wherein providing access to the one or more VNFs comprises bursting, using an application programming interface ("API"), one or more VNFs to one or more network functions virtualization ("NFV") entities at the one or more first networks.

21. The system of claim 16, wherein allocating at least one second network resource from at least one second network of a second set of networks for supplementing provision of the requested network services comprises providing the at least one second network with access to one or more virtual network functions ("VNFs") for use by the customer, the one or more VNFs providing the at least one second network resource having the desired performance parameters.

22. The system of claim 21, wherein providing access to the one or more VNFs comprises bursting, using an application programming interface ("API"), one or more VNFs to one or more network functions virtualization ("NFV") entities at the at least one second network.

23. The system of claim 16, wherein the desired performance parameters comprise at least one of a maximum latency, a maximum jitter, or a maximum packet loss.

24. The system of claim 16, wherein the desired performance parameters comprise at least one of performance parameters defined in a service level agreement ("SLA") associated with the customer or performance parameters defined in terms of natural resource usage.

25. The system of claim 16, wherein each of the one or more network performance metrics and the one or more updated network performance metrics comprises at least one of quality of service ("QoS") measurement data, platform resource data and metrics, service usage data, topology and reference data, historical network data, or network usage trend data.

26. The system of claim 16, wherein each of the one or more network performance metrics and the one or more updated network performance metrics comprises one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS").

27. The system of claim 16, wherein the determination that the one or more first networks is capable of providing network resources each having the desired performance parameters is based on one or more network performance metrics of the one or more first networks at the time that the request for network services from a customer is received.

28. The system of claim 16, wherein determining whether at least one first network of the one or more first networks can no longer provide at least one first network resource having the desired performance parameters comprises determining whether at least one first network of the one or more first networks can no longer provide at least one first network resource having the desired performance parameters, based at least in part on one or more network performance metrics of at least one of the one or more first networks, the at least one second network, the first set of networks, or the second set of networks.

29. The system of claim 16, wherein the set of instructions, when executed by the at least one processor, further causes the computing system to:

based at least in part on one or more of time of day usage data, day of week usage data, or peak usage data of each of at least one sixth network resource provided by at least one sixth network of the one or more first networks and at least one seventh network resource provided by at least one seventh network, stop allocation of the at least one sixth network resource provided by the at least one sixth network, and allocate the at least one seventh network resource provided by at least one seventh network for supplementing provision of the requested network services having the desired performance parameters, based at least in part on one or more further updated network performance metrics;

wherein the at least one seventh network is part of one of the first set of networks, the second set of networks, or a third set of networks that is separate from either the first set of networks or the second set of networks.

30. The system of claim 16, wherein determining whether at least one first network of the one or more first networks can no longer provide at least one first network resource, of the one or more network resources, having the desired performance parameters, based at least in part on one or more network performance metrics, is performed in one of a real-time manner, a periodic manner, a per-request manner, or a random manner.

31. The system of claim 16, wherein the network is a software defined network ("SDN").

* * * * *